United States Patent
Wirthlin

(10) Patent No.: US 6,872,933 B2
(45) Date of Patent: Mar. 29, 2005

(54) OPTICAL TRANSDUCER

(76) Inventor: Alvin R. Wirthlin, 201 Timberbluff La., Murphy, TX (US) 75094

( * ) Notice: Subject to any disclaimer, the term of this patent is extended or adjusted under 35 U.S.C. 154(b) by 648 days.

(21) Appl. No.: 09/828,101

(22) Filed: Apr. 7, 2001

(65) Prior Publication Data

US 2001/0022342 A1 Sep. 20, 2001

Related U.S. Application Data

(63) Continuation-in-part of application No. 09/350,487, filed on Jul. 9, 1999, now Pat. No. 6,333,512, and a continuation-in-part of application No. 09/332,203, filed on Jun. 12, 1999, now Pat. No. 6,246,049.
(60) Provisional application No. 60/092,968, filed on Jul. 15, 1998, and provisional application No. 60/223,063, filed on Aug. 4, 2000.

(51) Int. Cl.⁷ .................................... G01D 5/34
(52) U.S. Cl. ........................................ 250/229
(58) Field of Search ................. 250/229, 577, 250/231.13–231.19, 227.11–227.23; 356/402, 412, 437, 135, 136

(56) References Cited

U.S. PATENT DOCUMENTS

| | | |
|---|---|---|
| 4,371,897 A | 2/1983 | Kramer |
| 4,584,472 A | 4/1986 | Wiblin et al. |
| 4,727,247 A | 2/1988 | Johnston |
| 4,880,990 A | 11/1989 | Rando |
| 4,904,878 A | 2/1990 | Gipp et al. |
| 4,928,006 A | 5/1990 | Kershaw |
| 4,942,306 A | 7/1990 | Colbourne |
| 5,070,237 A | 12/1991 | Okuyama et al. |
| 5,132,530 A | 7/1992 | Groh et al. |
| H1364 H | 10/1994 | Toeppen |
| 5,376,785 A | 12/1994 | Chin et al. |
| 5,448,835 A | 9/1995 | Lewis |
| 5,755,036 A | 5/1998 | Lewis |
| 5,887,479 A | 3/1999 | Swanson |
| 6,166,630 A | 12/2000 | King |
| 6,172,377 B1 | 1/2001 | Weiss |
| 6,173,609 B1 | 1/2001 | Modlin et al. |

FOREIGN PATENT DOCUMENTS

| | | |
|---|---|---|
| DE | 3403887 A | 8/1985 |
| DE | 3908548 A | 10/1989 |
| DE | 19607086 A | 8/1997 |
| EP | 186138 | 7/1986 |
| FR | 2656688 A | 7/1991 |
| FR | 2728070 A | 6/1996 |
| GB | 2173894 | 10/1986 |
| JP | 117116 | 6/1985 |
| JP | 184706 | 7/1990 |

OTHER PUBLICATIONS

Search Report for PCT/US01/18126 Dated Dec. 27, 2001 in related PCT filing of pending U.S. application.

*Primary Examiner*—Tu T. Nguyen
(74) *Attorney, Agent, or Firm*—Alvin R. Wirthlin

(57) ABSTRACT

An optical transducer comprises a light source for emitting radiant energy, a base member, and an elongate light collector positioned for receiving radiant energy from the light source. The elongate light collector comprises a tunnel formed in the base member and a collector window that extends along a length of the tunnel. Radiant energy projected by the light source is received in the tunnel through the window and is transmitted along a length of the tunnel. A portion of the transmitted radiant energy exits the tunnel to thereby vary the intensity of light along the tunnel length. At least one photosensor is positioned for detecting the amount of radiant energy at a location in the tunnel. In this manner, the intensity of radiant energy at the tunnel location is indicative of at least relative position between the incident radiant energy and the at least one photosensor.

33 Claims, 19 Drawing Sheets

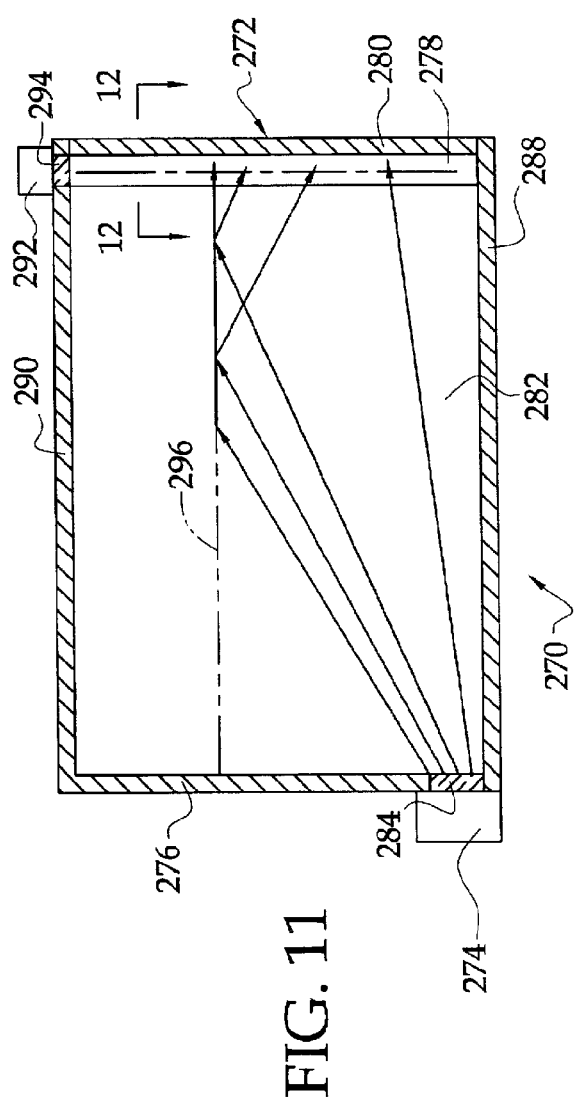
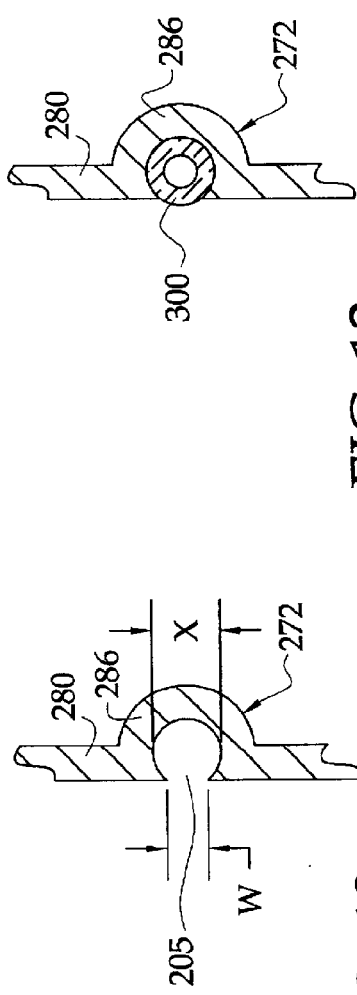
FIG. 11
FIG. 13
FIG. 12

OPTICAL TRANSDUCER

CROSS-REFERENCE TO RELATED APPLICATIONS

This application is a Continuation-in-Part of U.S. application Ser. No. 09/332,203 filed on Jun. 12, 1999, now U.S. Pat. No. 6,246,049. This application is also a Continuation-in-Part of U.S. application Ser. No. 09/350,487 filed on Jul. 9, 1999, now U.S. Pat. No. 6,333,512, which claims the benefit of U.S. Provisional Application No. 60/092,968 filed on Jul. 15, 1998. This application also claims the benefit of U.S. Provisional Application No. 60/223,063 filed on Aug. 4, 2000.

BACKGROUND OF THE INVENTION

1. Field of the Invention

This invention relates to optical transducers, and more particularly to optical transducers for determining position, orientation, direction, revolution, acceleration, fluid flow, fluid level, torque, pressure, opacity, and the like.

2. Description of the Related Art

Transducers for determining linear or angular position along one or more axes, orientation, direction, revolution, acceleration, fluid flow, fluid level, torque, pressure, and the like, are often used in vehicles, industrial equipment and other systems and components. Such transducers typically operate by detecting a change in an electrical property of the transducer, such as a change in resistance, capacitance, current flow, magnetic field, and so on, and may be embodied by variable capacitor or resistor mechanisms, optical systems, or Hall effect sensors.

By way of example, prior art liquid level sensors, such as fuel sensors for motor vehicles, usually include a float that rides on an upper surface of the fuel in a fuel tank. The float is typically connected to one end of a pivot arm while the other end of the pivot arm typically includes a wiper mechanism that brushes against a resistor strip when the arm is rotated due to a change in fuel level in the tank. Such sensors are prone to wear, mechanical and/or electrical breakdown or, at the very least, inaccurate liquid level detection. Although variable capacitance probes have been developed to overcome these drawbacks, they are cost-prohibitive in many applications and are typically limited to measure a certain type of liquid, since different liquids will have different dielectric properties. For example, a variable capacitance probe designed to measure fuel level normally will not be designed to measure water level.

Prior art linear transducers, such as linear variable differential transformers (LVDT's), are commonly used to detect the relative linear movement between objects, such as relative movement between a movable machine element or assembly and a stationary machine support. Although these transducers work well for their intended function, they are relatively heavy, difficult to manufacture, and high in cost, making them impractical for many low-cost applications.

Prior art angular position transducers and rotary sensors typically include a transparent encoder disk and a circumferential track imprinted thereon. A light source is positioned on one side of the disk in alignment with the track and a pair of spaced photodetectors are positioned opposite the light source on the other side of the disk. Typically, each track comprises a series of equally-spaced opaque bars separated by transparent sections. As the disk rotates, the bars and transparent sections cause the photodetectors to alternate between high and low states. A microprocessor typically receives the high and low states of each photodetector and determines the direction of disk rotation depending on which photodetector goes high or low first. The number of high or low states are then added or subtracted (depending on the direction of disk rotation) in order to determine the angular position of the encoder disk. These types of transducers can be relatively difficult and costly to manufacture and their resolution is typically limited by the number of bars in the circumferential track, the spacing between bars, the relative size of the transducers, and other factors. The bars must be accurately positioned on the disk, and the light source and photodetectors must be positioned very accurately with respect to the bars so that direction of disk rotation can be ascertained.

SUMMARY OF THE INVENTION

According to the invention, an optical transducer comprises a light source for emitting radiant energy, a base member, and an elongate light collector positioned for receiving radiant energy from the light source. The elongate light collector comprises a tunnel formed in the base member and a collector window that extends along a length of the tunnel, such that radiant energy projected by the light source through the window is incident on the tunnel and transmitted along a length of the tunnel with a portion of the transmitted radiant energy exiting the tunnel to thereby vary the intensity of light along the tunnel length. At least one photosensor is positioned for detecting the amount of radiant energy at a location in the tunnel. In this manner, the intensity of radiant energy at the tunnel location is indicative of at least relative position between the incident radiant energy and the at least one photosensor.

Further according to the invention, a method of detecting relative position between a first object and a second object comprises forming an elongate light collector on the first object, the elongate light collector including a tunnel and a collector window that extends along a length of the tunnel; projecting radiant energy into the tunnel from the second object; transmitting the radiant energy along a length of the tunnel with a portion of the transmitted radiant energy exiting the tunnel to thereby vary the intensity of light along the tunnel length; and detecting the amount of radiant energy at a location in the tunnel. In this manner, the intensity of radiant energy at the tunnel location is indicative of the relative position between the first and second objects.

Other features and advantages of the invention will become apparent upon reading the following detailed description and appended claims, and upon reference to the accompanying drawings.

BRIEF DESCRIPTION OF THE DRAWINGS

The preferred embodiments of the present invention will hereinafter be described in conjunction with the accompanying drawings, wherein like designations denote like elements throughout the drawings, and wherein:

FIG. 9 is an isometric view of an optical linear transducer according to a further embodiment of the invention;

FIG. 11 is a sectional view of a fluid holding container and an integrally formed optical fluid level transducer according to a further embodiment of the invention;

FIG. 12 is a cross section of a portion of the liquid holding container and fluid level transducer taken along line 12—12 of FIG. 11;

FIG. 13 is a cross section similar to FIG. 12 of a portion of a liquid holding container and fluid level transducer according to a further embodiment of the invention;

It is noted that the drawings are intended to depict only typical embodiments of the invention, and therefore should not be considered as limiting the scope thereof. The invention will now be described in greater detail with reference to the accompanying drawings.

DETAILED DESCRIPTION OF THE PREFERRED EMBODIMENTS

Figures 1, 2:
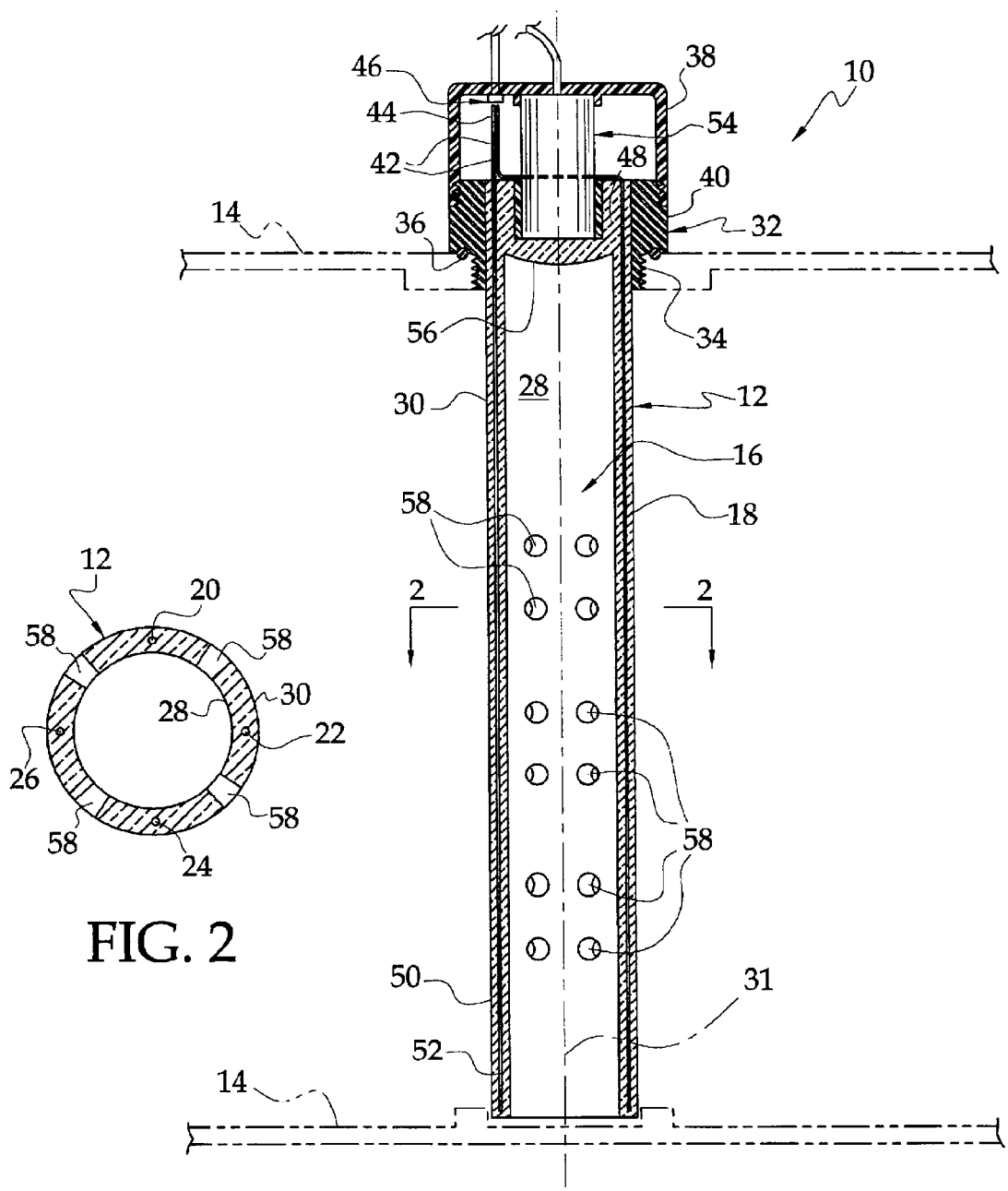
FIG. 1 is an elevational view in cross section of an optical fluid level transducer according to a first embodiment of the invention for mounting in a container.
FIG. 2 is an enlarged cross-sectional view of the optical fluid level transducer taken along line 2—2 of FIG. 1.

Referring now to the drawings, and to FIGS. 1 and 2 in particular, a fluid level transducer 10 according to the present invention is illustrated. The fluid level transducer 10 includes an elongate tubular member or housing 12 that is adapted for mounting in a container 14 (shown in phantom line), such as the fuel tank of a motor vehicle. The tubular member 12 includes a central bore 16 and has a continuous wall 18 that surrounds the central bore. The tubular member 12 is preferably constructed of transparent or translucent material that is resistant to the liquid in which it is to be immersed. A plurality of conduits 20, 22, 24, and 26 are preferably formed at equally spaced circumferential intervals in the wall 18 of the tubular member between an inner wall surface 28 and an outer wall surface 30, and extend generally parallel to a central axis 31 of the tubular member. The conduits can be formed simultaneously with the tubular member during extrusion or other molding processes. Alternatively, smaller tubing (not shown) may be adhered to the inner and/or outer surfaces of the tubular member or co-extruded therewith.

A tank mounting flange 32 is located at an upper end 48 of the tubular member 12. The tank mounting flange 32 may be secured to the tubular member by adhesives, ultrasonic welding, or other well-known attachment means. The mounting flange 32 has a threaded lower portion 34 that engages with corresponding threads in the container 14. An O-ring 36 may be provided adjacent the threaded lower portion 34 for sealing the mounting flange 32 to the tank 14. A cap member 38 can be threaded onto an upper portion 40 of the mounting flange.

Light collectors 42, preferably in the form of generally elongate fluorescent-doped fiber optics or the like are positioned in each conduit 22 to 26. A suitable fluorescent-doped fiber optic may be constructed of a polystyrene-based core containing one or more fluorescent dopants that is surrounded by a polymethyl methacrylate cladding. When such a fiber optic receives radiation along its length, energy is absorbed in the fiber optic at a certain wavelength and is re-emitted at both ends of the fiber optic at a higher energy and longer wavelength. Thus, depending on the amount of radiation absorbed by the fiber optic along its length, a proportionate amount of radiation is emitted at the ends of the fiber optic. Although the fiber optic is preferably circular in cross section, it is contemplated that other cross sectional shapes such as oval, triangular, rectangular, arcuate, etc., may be used. Moreover, it will be understood that the light collector 42 is not to be limited to the particular material as set forth in the exemplary embodiment. The core and cladding may be formed out of any suitable transparent or translucent materials, as long as the index of refraction of the core material is greater than the index of refraction of the cladding material. The cladding material itself may be air or other fluid surrounding the core. Transparent or translucent material combined with a fluorescent dopant material may alternatively be injected into the conduits to serve as the light collectors 42.

At least one end of each light collector 42, such as upper end 44, is proximal to a photosensor 46 that preferably varies in electrical output in response to light level variations to which the photosensor is exposed. Suitable photosensors may include, without limitation, photocells, photodiodes, phototransistors, photoconductors, and the like. As shown in FIG. 1, a single photosensor 46 is positioned at an upper end 48 of the tubular member 12 within the cap member 38 for measuring radiant energy incident on the upper ends 44 of all the light collectors 42. It will be understood, however, that more than one photosensor may be positioned at the upper end 48 of the tubular member in alignment with one or more of the light collectors. Moreover, although four separate light collectors 42 are shown, more or less light collectors can be used depending on the strength and sensitivity of the measurement output desired. A photosensor may additionally or alternatively be positioned at a lower end 50 of the tubular member 12 proximal to a lower end 52 of one or more of the light collectors 42 for measuring the intensity of radiant energy at one or more of the lower ends 52. Preferably, the photosensors are arranged at one or more of the collector ends so as to detect only light emanating therefrom.

A light source 54 is positioned at the upper end 48 of the tubular member 12, preferably within the cap member 38, so as to project light into the central bore 16 between the light collectors 42. In one preferred embodiment, light is emitted from the light source 54 at an angle such that the light may project onto the tubular member 12 and along the lengths of the light collectors 42. For this purpose, a diverging lens 56 may be provided in the tubular member 12 adjacent the light source 54. As shown, the lens is preferably integrally molded with the tubular member, but may be formed separately and attached to the upper end of the tubular member.

The light source 54 may be in the form of one or more fluorescent lights, incandescent bulbs, light-emitting diodes, laser diodes, or any other source that emits radiant energy in one or more of the visible, ultra-violet, or infra-red spectrums. When an infra-red light source is used, the or each photosensor may include a daylight filter. Although the light source 54 is shown positioned at the upper end 48 of the tubular member 12, it may additionally or alternatively be positioned at the lower end 50 of the tubular member. Where two light sources are mounted at opposite ends of the tubular member, the light sources should emanate light at different pulsating frequencies and/or wavelengths so as to distinguish between them.

A plurality of apertures 58 preferably extend through the wall 18 of the tubular member 12 to allow the transfer of liquid between the central bore 16 and the container 14. The apertures 58 are preferably located at axially spaced locations along the tubular member and may also be circumferentially spaced around the tubular member. Depending on the size and number of apertures 58, the rate at which liquid enters and leaves the tubular member can be controlled. This is especially advantageous when the liquid in the container is subject to sloshing. At equilibrium, the level of liquid in the tubular member is equal to the level of liquid in the container. When liquid sloshing occurs within the container, the apertures in the tubular member may be sized to create a delay in the transfer of fluid between the container and the tubular member to thereby dampen variations in liquid level within the tubular member.

Although not shown in FIG. 1, an opaque material may surround the tubular member or the tubular member may be located within an opaque housing for blocking unwanted outside light that may be transmitted through containers constructed of translucent material, especially when using a light source that transmits light in the visible spectrum.

Depending on the opacity of the liquid to be measured, light absorption in the liquid may be quite different than in air. This difference can be detected by measuring how much light emitted from the light source is reflected and/or absorbed by the liquid. Where the light from the light source is at least partially absorbed by the liquid being measured, less light is able to reach the light collector 42 when the container 14 is full. As the container empties, the level of liquid within the tubular member descends and exposes more of the length of fiber optic to the emitted light. As more of the fiber optic is exposed to the light, the intensity of light at the ends of the fiber optic increases. This change in intensity is measured by the photosensor(s) 46, which is reflective of liquid level in the container.

Figures 3, 4:
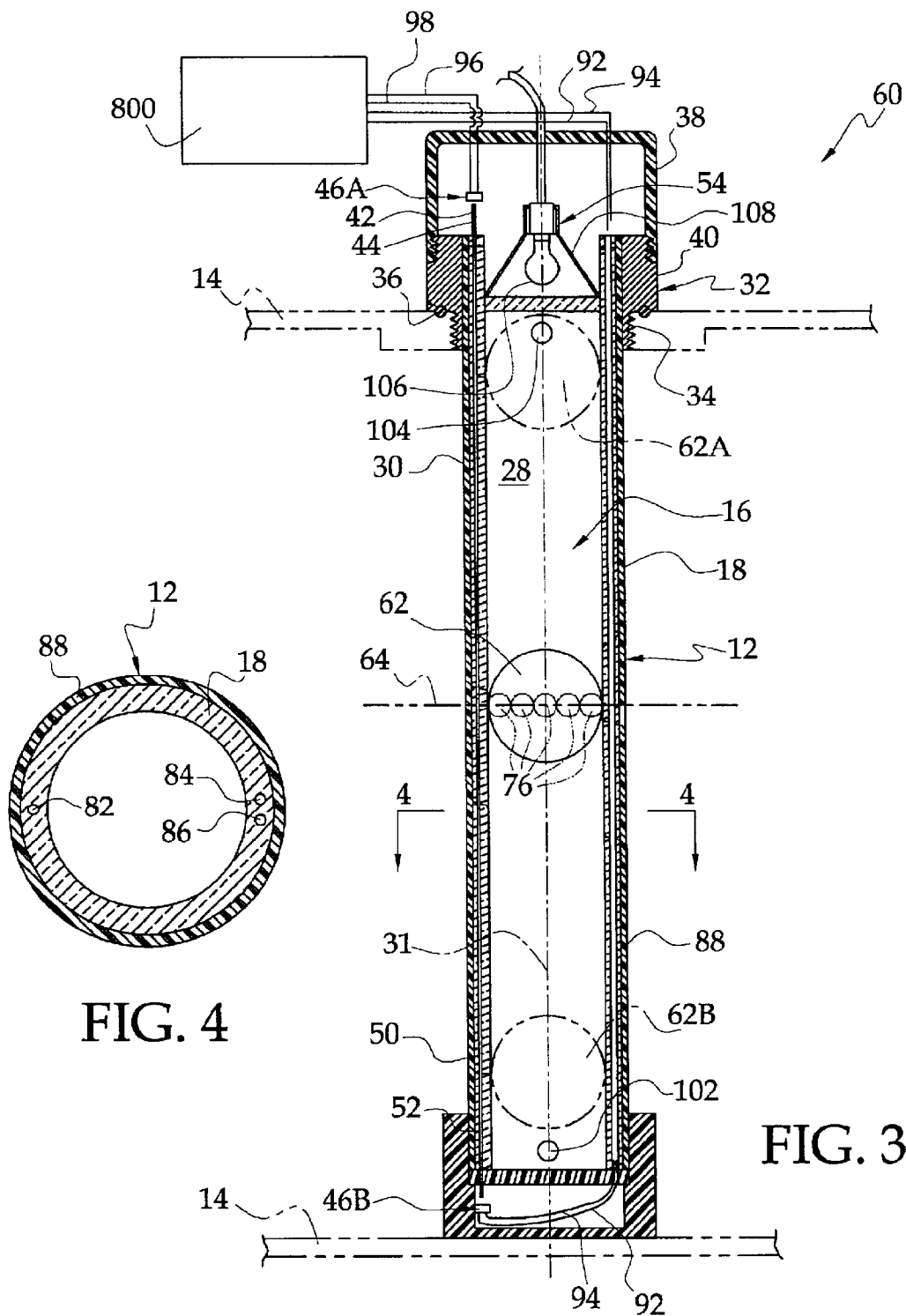
FIG. 3 is an elevational view in cross section of an optical fluid level transducer according to a further embodiment of the invention.
FIG. 4 is a cross-sectional view of the optical fluid level transducer taken along line 4—4 of FIG. 3.

With reference now to FIG. 3, a fluid level transducer 60 according to a further embodiment of the invention is illustrated, wherein like parts in the previous embodiment are represented by like numerals. In this embodiment, a float 62 is located in the tubular member 12 and is preferably substantially spherical in configuration. The outer diameter of the float 62 is slightly smaller than the inner diameter of the tubular member to allow free movement of the float within the tubular member. The float is preferably constructed of an opaque material and may also or alternatively have an outer reflective coating. The float 62 rides along the upper surface 64 (represented by phantom line) of the liquid in the tubular member and serves to substantially block light from the length of the light collectors 42 below the liquid level. This is especially advantageous when the liquid being measured exhibits low light absorption characteristics, which is prevalent in transparent or many translucent liquids. The float 62 also eliminates the need to calibrate the probe for different liquids having different light absorption properties. Since the float 62 is spherical and free-floating in the tubular member 12, it is not subject to the difficulties associated with prior art floats and their attached pivot arms. Moreover, the spherical nature of the float 62 helps to prevent inaccurate measurement when the liquid in the tubular member 12 is subject to gravitational or acceleration forces. The tubular member 12 includes a collector conduit 82 and conductor conduits 84 and 86 that are formed in the wall of the tubular member and extend generally parallel to the central bore 16. Preferably, the conductor conduits 84 and 86 are positioned close together while the collector conduit 82 is located at a diametrically opposite side of the tubular member, but may alternatively be positioned closer to the conductor conduits. An opaque covering 88 surrounds the tubular member 12 and serves to block the transmission of unwanted outside light to the collector in the event that the container 14 is constructed of light permeable material. The conduits 82, 84 and 86, as well as the opaque covering 88 can be formed simultaneously with the tubular member during extrusion or other well-known forming processes.

A light collector 42, preferably similar in construction to the light collectors previously described, is located in the collector conduit 82. The light collector may be co-extruded with the tubular member, injection-molded into the conduit 82 or snaked through the conduit 82 after formation of the tubular member.

An upper photosensor 46A is positioned proximal to the upper end 44 of the light collector 42 while a lower photosensor 46B is positioned proximal to the lower end 52 of the light collector for monitoring the intensity of light at the light collector ends. Electrical leads 92 and 94 from the lower photosensor 46B pass through the conductor conduits 84 and 86, respectively, and into the cap 38. Electrical leads 96, 98 from the upper photosensor 46A together with the electrical leads 92, 94 are connected to signal processing circuitry 800, as will be described in greater detail below with respect to FIG. 41. The electrical leads can be co-extruded with the tubular member 12.

A fluid fill aperture 102 extends through the wall 18 of the tubular member 12 at the lower end 50 while a vent aperture 104 extends through the wall 18 at the upper end 48. As in the previous embodiment, the size and shape of the apertures can be adjusted to obtain a predetermined damping effect for fluid in the tubular member when fluid in the container is subject to sloshing or other movement.

A light source 54 is located at the upper end 48 of the tubular member and preferably includes a long-life incandescent bulb 106 surrounded by a reflector 108. However, other light sources as previously described may be used. Preferably, the reflector 108 is configured for reflecting and collimating light from the bulb 106 directly onto the float 62, which in this embodiment is coated with a reflective material. The float then reflects the incident light onto the light collector 42 in the vicinity of the float. In an alternative embodiment, the reflector or other light source may be arranged to project light onto both the light collector 42 and the float 62.

Since the fluorescent-doped fiber optic absorbs and loses light along its length, the light intensity at each collector end varies according to the position of the float along the length of the collector. By way of example, when the container is full, the float is positioned at the upper end 48 of the tubular member 12, as represented by phantom line 62A. Collimated light is projected onto the float and is reflected onto the light collector 42. The light collector in turn channels the incident light to the upper and lower ends 44 and 52 of the light collector and onto the photosensors 46A and 46B, respectively. Some of the light received by the light collector 42 is reflected internally while some of the light is refracted out of the light collector. The light intensity at the upper end 44 of the light collector 42 is greater than the light intensity at its lower end 52 due to the longer distance from the incident light through which the light may be refracted out of the light collector. As the distance between the incident light and the upper end 44 of the light collector increases, e.g. when the float descends due to less liquid in the container, the light intensity at the upper end of the light collector decreases due to the increased distance through which the light may be refracted out of the light collector. Likewise, the light intensity at the lower end of the light collector increases due to the decreased distance through which the light may be refracted out of the light collector.

As the float 62 descends toward the lower end 50 of the tubular member 12, as represented by phantom line 62B, such as when liquid is removed from the container, the light intensity at the lower end 52 of the light collector becomes greater than the light intensity at its upper end. The light intensity at one or both ends of the light collector can be measured by the photosensors 46A, 46B in order to determine the position of the float with respect to the light collector, and thus the level of liquid in the container.

When the light source is arranged to project light directly onto the light collector, a different effect occurs. When the light source 54 and float 62 are at the upper end 48 of the tubular member 12, the light intensity at the upper end 44 of the light collector 42 is greater than the light intensity at the lower end 52. This is because light is already incident on the upper end 44 of the light collector 42 from the light source 54. Some of the light that propagates toward the lower end 52 of the light collector is refracted out of the collector due to the length between the light source 54 and the lower light collector end 52. This results in the relatively low light intensity at the lower light collector end 52. When the float 62 descends toward the lower end 50 of the tubular member, the light intensity at the light collector lower end 52 increases since the length of the light collector exposed to light increases. The intensity at the upper collector end 44 increases much less dramatically, since the upper portion of the light collector initially exposed to the light is near saturation.

With each of the above arrangements, the signals from the upper and lower photosensors can be compared, normalized, etc., to eliminate signal variations that may occur from material aging, variations in light intensity, temperature effects on the photosensors, and other effects, as will be described in greater detail below with respect to FIG. 41.

In another preferred arrangement, the upper photosensor 46A can be situated for receiving light directly from the light source 54 and the signals from both photosensors can be used to compensate for the above-noted variations.

Although a single float 62 is shown for each of the above embodiments, a plurality of floats 76 (shown in phantom line in FIG. 3) of smaller diameter or of different shapes can be used. The use of plural floats decreases the likelihood of their temporary adherence to the tubular member due to surface tension, dimensional changes from temperature, humidity, deposits, and so on, than when a single float is used.

Figure 5:
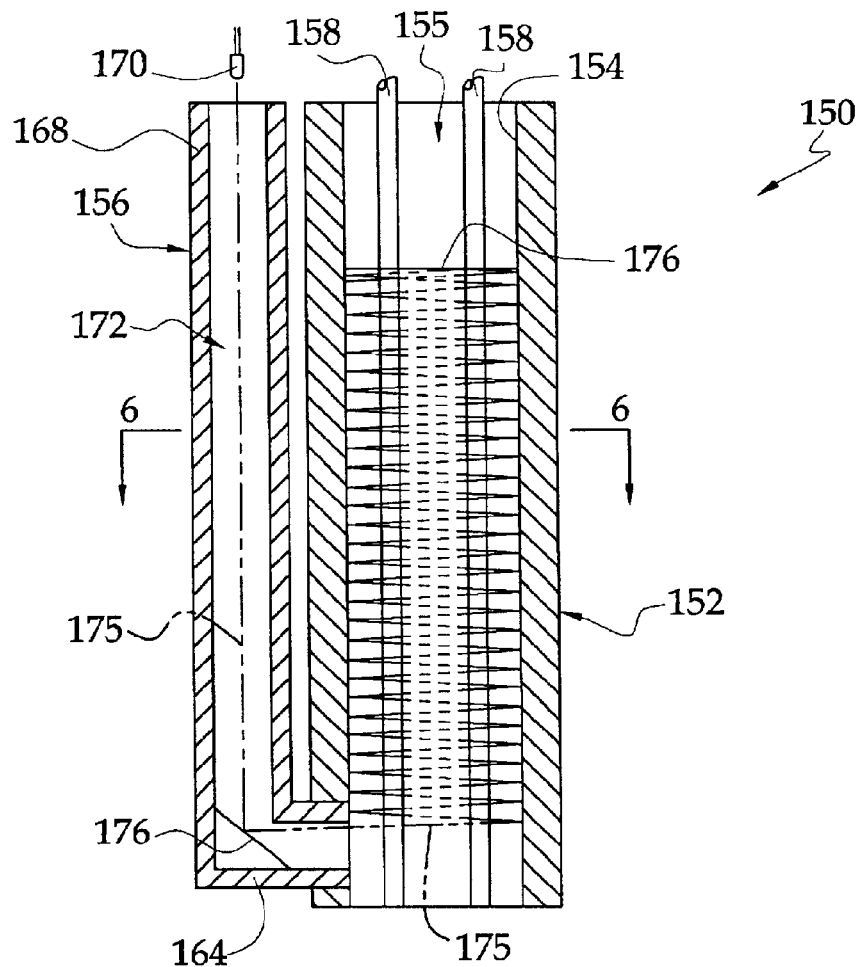
FIG. 5 is an elevational view in cross section of an optical fluid level transducer according to a further embodiment of the invention.
Figure 6:
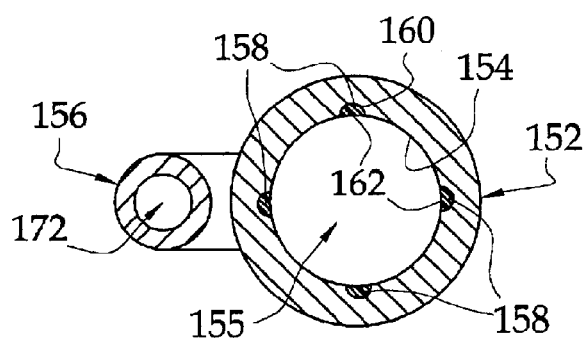
FIG. 6 is a cross sectional view of the optical fluid level transducer taken along line 6—6 of FIG. 5.

Referring now to FIGS. 5 and 6, a fluid level transducer 150 according to a further embodiment of the invention is illustrated. The fluid level transducer 150 comprises a housing or tubular member 152 with an inner reflecting surface 154 that defines a bore 155. A tubular light guide 156 is positioned alongside the tubular member 152. The tubular member 152 is preferably constructed of a metallic material that can be highly polished on the inner surface, such as through electropolishing. Alternatively, the tubular member 152 can be constructed of a plastic material with a reflective coating deposited on the inner surface 154 in a well-known manner. Although the tubular member 152 is show as circular in cross section, many different cross sectional shapes are contemplated, such as rectangular, triangular, oval, etc.

One or more light collectors 158, preferably similar in construction to the light collectors 42 previously described, are located within channels 160 formed in the inner surface 154. Each light collector 158 preferably has an inner surface 162 that is flush with the inner surface 154 of the tubular member 152. The light collectors 158 are preferably constructed of a base material that is compatible to the liquid being measured, since they are in direct contact with the liquid.

A lower end 164 of the tubular light guide 156 is connected to the tubular member 152 while an upper end 168 thereof is positioned in proximity to a light source 170, such that light is projected into a bore 172 of the tubular light guide. A reflective surface 176 within the bore 172 directs light 175 at an acute angle with respect to horizontal into the tubular member. The light guide 156 may alternatively be in the form of a fiber optic that extends from the light source 170 to the lower end of the tubular member. A laser diode or collimated light is preferable, although other sources of light may be used.

The light entering at the lower end of the tubular member 152 from the light source 170 can project, for example, upwardly at an angle of approximately 89 degrees with respect to vertical. In this manner, light is transmitted through the liquid in the tubular member 152 and reflected upwardly from the inner surface 154 until it reaches the upper surface 176 of the liquid. When the liquid has a greater index of refraction than the air, gas or vapor above it, and the angle of light incident on the upper surface 176 of the liquid is greater than or equal to a predetermined critical angle with respect to vertical, the light is totally reflected on the upper surface. Thus, only light transmitted through the liquid will be incident on the light collectors 158. As the liquid level in the tubular member decreases, less of the collector length will be exposed to the light. Likewise, as the liquid level in the tubular member increases, more of the collector length will be exposed to the light. As in the previous embodiments, one or more photosensors (not shown) are arranged at the ends of the light collectors.

By way of example, if the liquid being measured is octane in the form of $C_8H_{18}$, the critical angle is approximately 451 with respect to vertical. With light entering the tubular member 152 at 891 with respect to vertical, total internal reflection of the light will occur even when the octane is tilted up to an angle of approximately 441 with respect to vertical, as may occur during climbing, descending, acceleration, deceleration, etc., of the vehicle. It is to be understood, of course, that light entering the bore 155 from the light guide 156 may be oriented at other angles. Although a tubular member is preferred for measuring the level of liquid, the light source may be arranged to project radiant energy directly into the container with one or more of the light collectors arranged in the container wall, as will be described in greater detail below with respect to FIG. 11.

In an alternative arrangement, one or more floats can be positioned in the bore 155 for blocking light from reaching the light collectors 158 above the liquid level 176.

Figure 7:
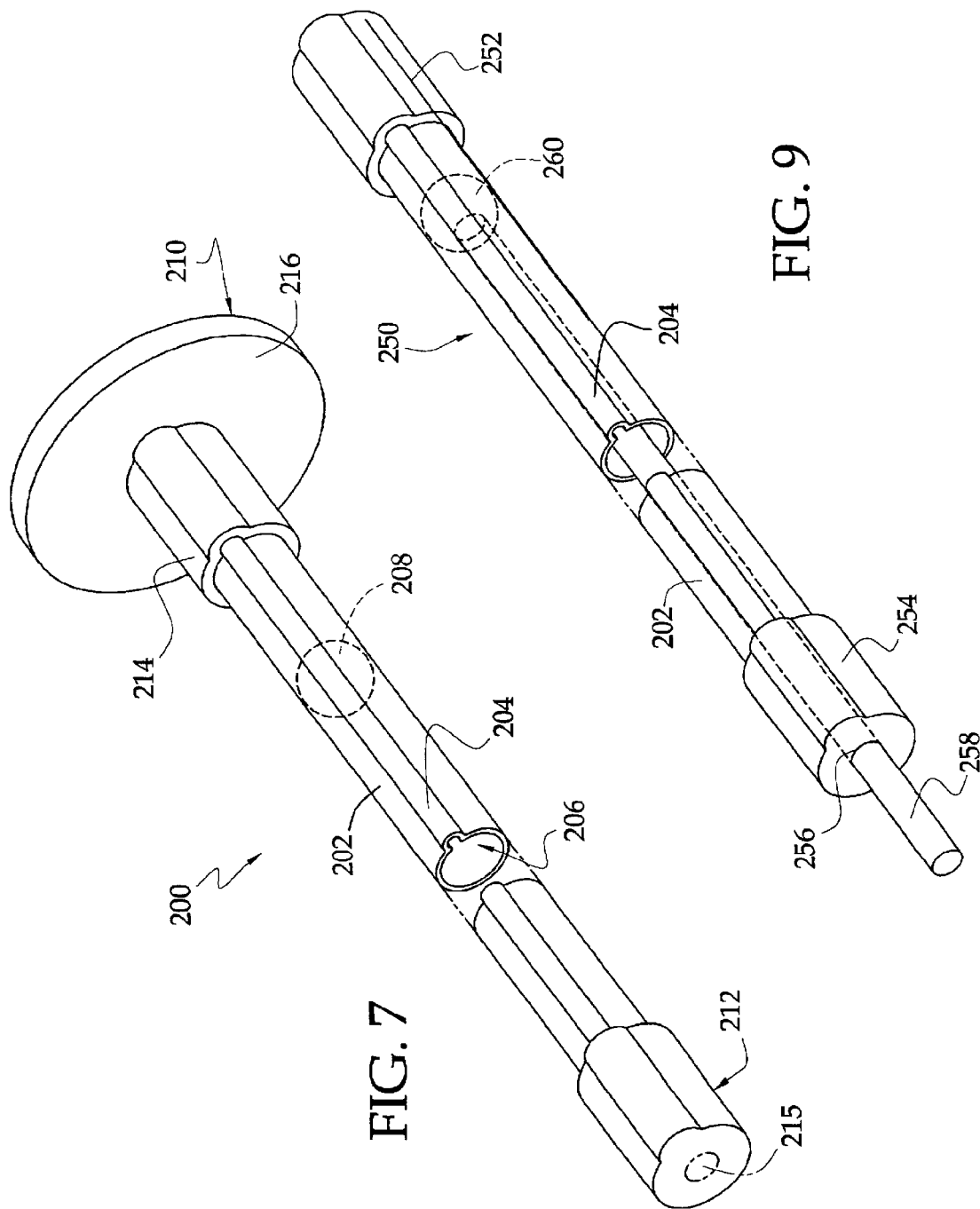
FIG. 7 is an isometric rear view of an optical transducer according to a further embodiment of the invention.
Figure 8:
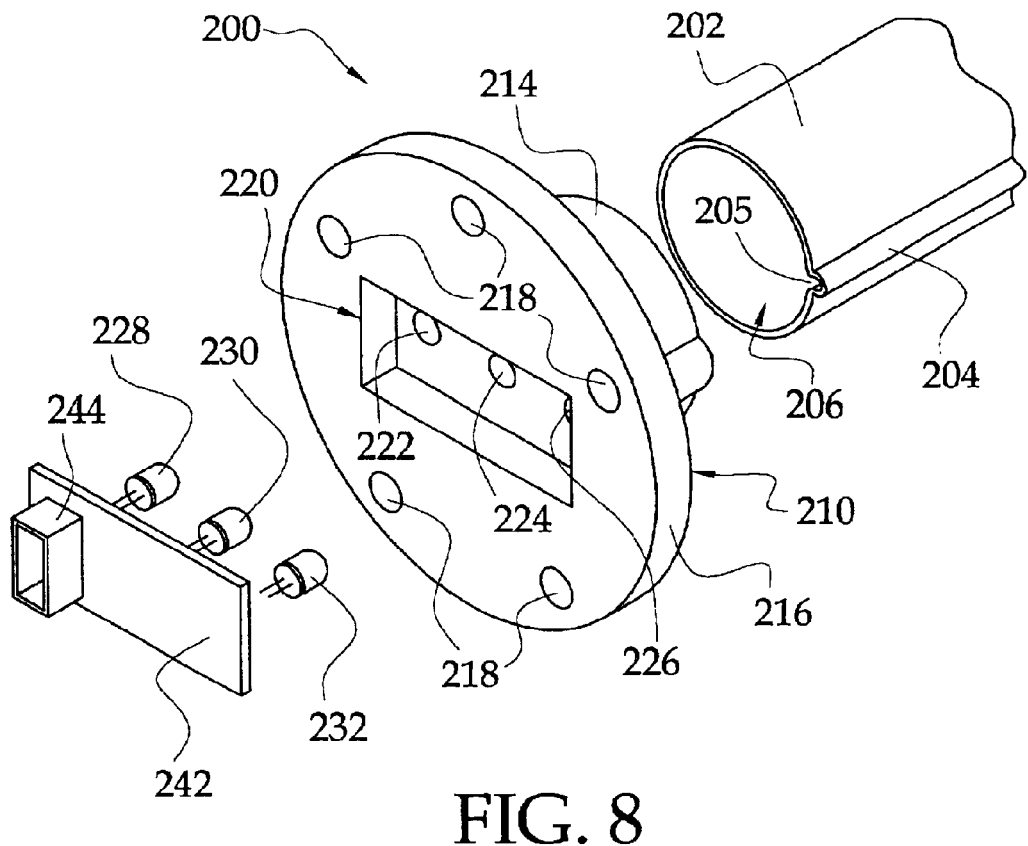
FIG. 8 is an enlarged isometric front view of an end cap for use with the optical transducer of FIG. 7.

Referring now to FIGS. 7 and 8, an optical liquid level transducer 200 according to a further embodiment of the invention is illustrated. The transducer 200 includes an elongate tubular member 202 with a light collector arranged as an elongate light collecting tunnel or channel 204 that is formed in a wall of the tubular member. The light collecting channel 204 opens into an interior bore 206 of the tubular member 202 through a gap 205 and preferably extends parallel to a central tube axis, but may spiral around the tubular member. More than one light collecting tunnel or channel may be provided, depending on the particular application. The tubular member 202, including the channel 204, is preferably constructed of an opaque material and may have an inner reflective coating. A float 208 (shown in hidden line) of opaque construction is located within the interior 206 and is free to slide along a length of the tubular member. An upper end cap 210 is preferably fixedly connected to an upper end of the tubular member 202 while a lower end cap 212 is preferably fixedly connected to a lower end of the tubular member to thereby entrap the float 208. Suitable openings (not shown) may be formed in the tubular member and/or end caps to permit the ingress and egress of liquid and vapor in the tubular member.

The lower end cap 212 preferably includes a photosensor (not shown) in alignment with the light collecting channel 204. A filter 215 (shown in phantom line), such as a fuel filter, may be insert-molded with the lower end cap 212 or otherwise attached thereto to filter out contaminants before the liquid enters into the tubular member 202.

As shown most clearly in FIG. 8, the upper end cap 210 includes a tube mounting portion 214 that receives an upper end of the tubular member 202 and an tank mounting portion 216 that is preferably formed integral with the lower tube mounting portion. The tank mounting portion 216 may include apertures 218 that receive mounting studs (not shown) associated with a tank or other container. A depression 220 is preferably formed in the upper end cap 210 and includes apertures 222, 224 and 226 for receiving photosensor 228, light source 230, and photosensor 232, respectively. The apertures 224 and 226 are in optical communication with the interior of the tubular member, with the aperture 224 aligned with the tube central axis and the aperture 226 aligned with the light collecting channel 204. Alternatively, the aperture 224 may be offset from the tube central axis. With this construction, the light source 230, which may be similar in construction to the light sources 54 previously described, projects radiant energy into the tubular member 202 and channel 204.

Figure 10:
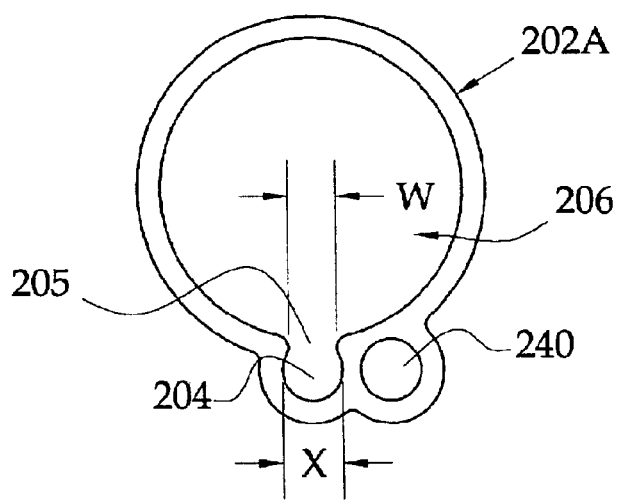
FIG. 10 is an enlarged top plan view of a transducer tube according to a further embodiment of the invention

Referring again to FIG. 7, the float 208 rides along an upper surface of the liquid in the tubular member and serves to substantially block light from the length of the light collecting channel 204 below the liquid level. At least a portion of the light within the channel 204 is transmitted to the ends of the channel where it can be detected by an upper photosensor 226 and/or by a lower photosensor (not shown) which is preferably located in the lower end cap 212. Surprisingly, it has been found that the channel 204 behaves in a similar manner as the fluorescent-doped fiber optic light collectors previously described, wherein the intensity of light at the ends of the channel vary in proportion to the amount of light incident in the channel, as well as the distance of the incident light from the ends of the channel. Thus, as the float 208 travels from the upper end of the tubular member 202 to the lower end thereof, the light intensity at the lower end of the channel 204 increases proportionately. As shown in FIG. 10, a width W of the gap 205 is preferably smaller than a cross-dimension X of the channel 204. It is believed that the width W of the gap 205 can be varied to vary the intensity of light at the ends of the channel 204 during operation. By way of example, it is believed that a smaller gap results in less light reflecting out of the channel than a larger gap. A light reflective coating on the inside of the channel results in more light being reflected along the length of the channel while a light absorbing coating results in more light being refracted out of the channel. Thus, the width of the gap and the reflectivity of the channel inner surface can be varied to adjust the range of intensity of light at the ends of the channel 204 for a given length of float travel to suit a wide variety of different applications.

It has been found that the best resolution is obtained when the float is located between the light source and the light detector. Where it is desirous to isolate the electronics from the tank, a tubular member 202A as shown in FIG. 10 may be used, wherein like parts in the previous embodiment are represented by like numerals. The tubular member 202A includes a tunnel 240 that extends along a length of the tubular member, preferably adjacent the light collecting channel 204. The tunnel 240 is adapted to receive reflected light from the channel 204 through a reflector (not shown) that can be located in the lower end cap and extend across the channel 204 and tunnel 240. In this manner, light incident at the lower end of the channel is redirected to an upper end of the tubular member 202A where it can be detected by a photosensor. The inner surface of the tunnel 240 may have a reflective coating. In a further embodiment, the tunnel 240 may be replaced by a fiber optic or other light guide. The tunnel may alternatively be used to house electrical wires that extend from a lower photosensor to thereby isolate the wires from the liquid being measured.

Referring again to FIG. 8, the photosensor 228 may be arranged to receive light directly from the light source 230 for calibration, as will be described in greater detail below. Preferably, the photosensors 228, 232 and the light source 230 are mounted on one side of a printed circuit board 242 to be in alignment with their respective apertures, and an electrical connector 244 is mounted on the other side of the circuit board. Other electronics (not shown) can also be mounted on the circuit board 242. The circuit board 242 is preferably sized to be received in the depression 220 and may be sealed therein with epoxy or other material to protect the electronics from the outside environment. A transparent seal may also be located in the apertures 222, 224 and 226 or across the tubular member adjacent the upper end cap to isolate the photosensors and light source from liquid and vapor in the tubular member.

With reference now to FIG. 9, a linear transducer 250 according to a further embodiment of the invention is illustrated, wherein like parts in the FIG. 8 embodiment are represented by like numerals. The linear transducer 250 includes a tubular member 202 with a light collecting channel 204. An upper end cap 252 is preferably connected to an upper end of the tubular member while a lower end cap 254 is preferably connected to a lower end thereof. The upper and/or lower end caps 252, 254 may include one or more light sources and photosensors as previously described. The lower end cap 254 includes an opening 256 through which a rod or shaft 258 is slidably received. A light blocking member 260 is connected to an inner end of the shaft for movement therewith in the tubular member 202. With this arrangement, the shaft may be connected to one structure and the tubular member may be connected to another structure. Relative linear movement between the structures can thus be detected as the light blocking member 260 travels toward and away from the end caps.

In a further embodiment of the invention, the shaft 258 may include external threads (not shown) and the opening 256 may have internal threads (not shown) for mating with the external threads. Relative rotational movement between the shaft 258 and the end cap 254 causes the light blocking member 258 to move within the tubular member, such movement being detected by one or more photosensors as previously described.

In each of the above-described embodiments the liquid level transducer can be used as a linear transducer by providing a light blocking member inside the tubular member with a shaft that extends out of the tubular member.

With reference now to FIGS. 11 and 12, and in accordance with a further embodiment of the invention, an optical fluid level transducer 270 is preferably incorporated into a fluid holding container or tank 272. The fluid level transducer 270 includes a light source 274 connected to a wall 276 of the tank and an elongate light collector 278 positioned on another wall 280 of the tank. The light source 274, which may be similar in construction to the light sources 54 previously described, is arranged for projecting radiant energy through liquid 282 in the tank and toward the light collector 278. A window 284 may be formed in the wall 276 of the tank when the light source 274 is mounted outside of the tank. The elongate light collector is preferably formed integrally in the wall 280 as an open tunnel or channel 286, as shown most clearly in FIG. 12. The open channel 286 can be similar in shape to the open channel 204 in the FIG. 10 embodiment, and can extend between a bottom wall 288 and a top wall 290 of the tank 272. The channel 286 may follow the geometry of the wall 276, and therefore be less intrusive in the tank. Although the channel 286 is shown positioned on a wall opposite the light source, it is to be understood that the channel can be formed on other walls of the tank, or formed on a separate plate or other member and mounted in the tank. In addition, more than one tunnel or channel can be formed for multiple measurements. A photosensor 292, which may be similar to the photosensors previously described, is positioned at an upper end of the channel 286 for detecting the intensity of radiant energy at an upper end of the light collector 278. Although not shown, a further photosensor may be positioned at a lower end of the light collector 278. When the photosensor 292 is mounted outside the tank 272, a window 294 can be formed in the tank adjacent the upper end of the light collector 278 so that radiant energy incident at the light collector end can be transmitted to the photosensor through the window.

In use, radiant energy from the light source 274 is projected through the liquid 282 toward the collector 278 at an angle that is substantially equal to or less than the critical angle for total internal reflection of the radiant energy on the upper surface 296 of the liquid 282. As previously described, the critical angle depends on both the index of refraction of the liquid 282 and the index of refraction of the vapor or air above the liquid. As the liquid level descends in the tank, less and less light will be incident along the length of the light collector. Consequently, the level of radiant energy at the upper end of the light collector 278 will decrease, as measured by the photosensor 292.

Turning now to FIG. 13, a transparent tube 300, rod, or the like can be positioned in the channel 286. The transparent tube serves to protect the channel from film build-up that may result from certain liquids. The transparent tube can also be used for measuring liquids or other fluent-like materials that are relatively opaque. In this instance, the light source 274 can be positioned for projecting radiant energy into the tube from above the surface 296 of the liquid. A tube constructed of a clear FEP material or the like may be suitable for many different types of liquids.

Although not shown, a transparent tube, rod or the like may be installed in the open channel in each of the embodiments of FIGS. 7–10.

Figure 14:
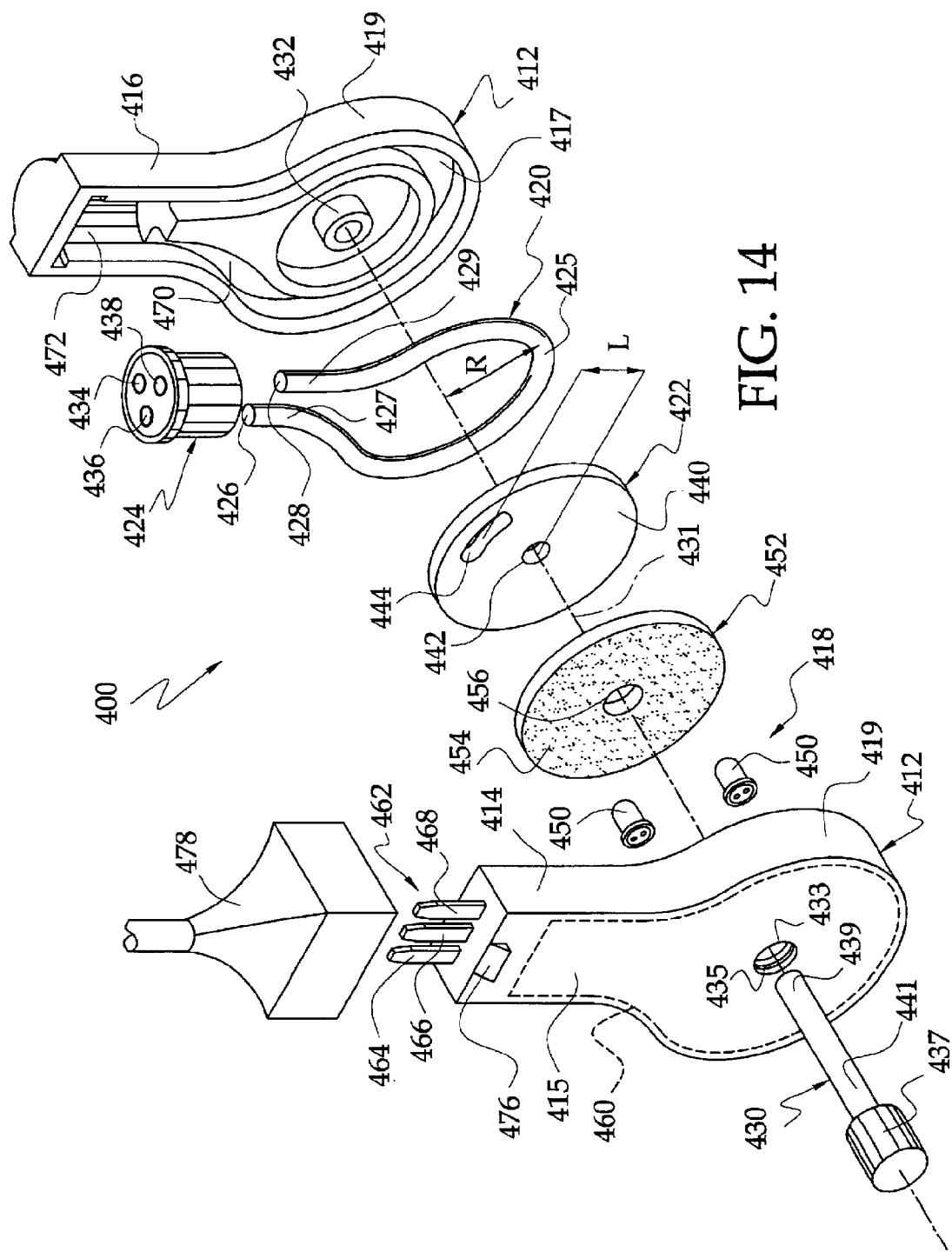
FIG. 14 is an exploded isometric view of an optical transducer according to a further embodiment of the invention.
Figure 15:
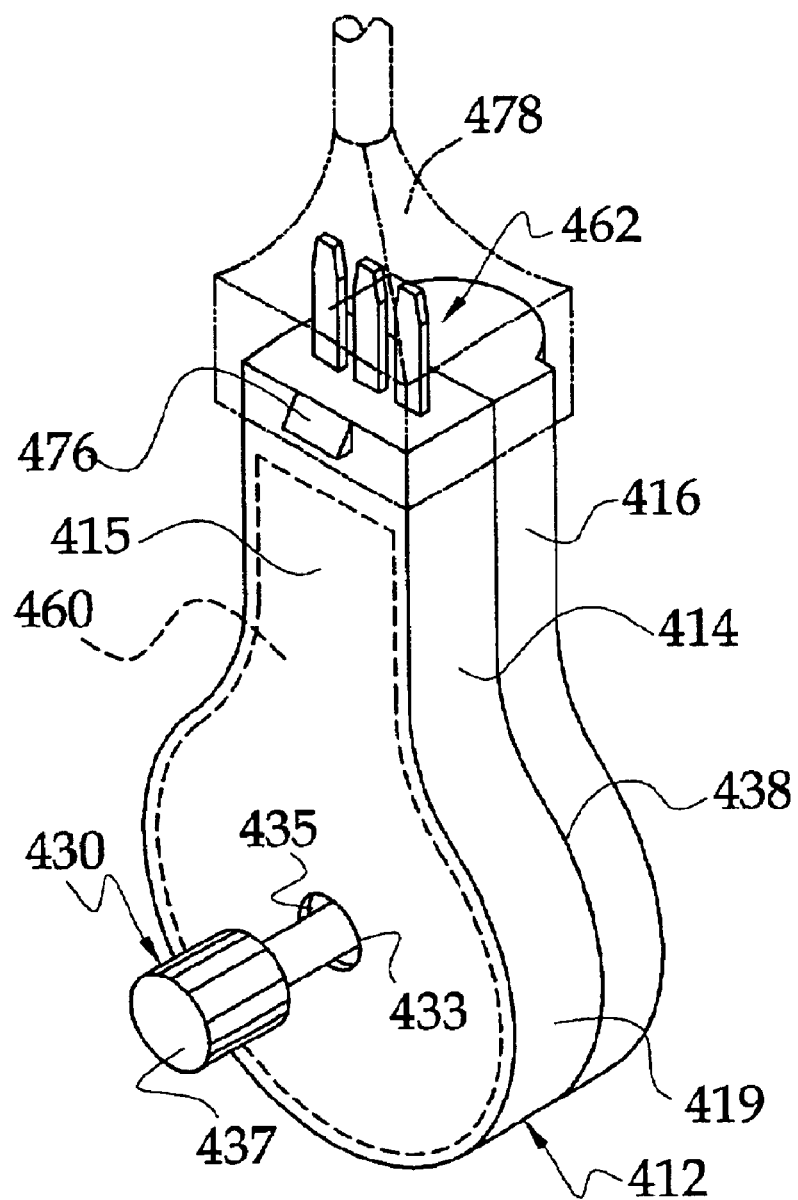
FIG. 15 is an isometric view of the assembled optical transducer of FIG. 14.

With reference now to FIGS. 14 and 15, an optical angular transducer 400 according to a further embodiment of the invention is illustrated. The optical transducer 400 includes a housing 412 with a first housing half 414 and a second housing half 416, a light source 418 arranged for projecting radiant energy onto a light collector 420, a light blocking disk 422 interposed between the light collector 420 and the light source 418, and a photosensor module 424 arranged at the ends 426, 428 of the light collector 420. Preferably, the light source 418, collector 420, blocking disk 422 and module 424 are all located within the housing 412.

The housing 412 includes a front wall 415 formed on the first housing half 414, a rear wall 417 formed on the second housing half 416, and a continuous side wall 419 formed on both housing halves. When assembled, the continuous side wall 419 extends between the front and rear walls 415 and 417 to form an inner compartment A shaft 430 is rotatably mounted to the housing 412 about a rotational axis 431 and preferably includes an inner shaft portion 439 that extends through an opening 433 of the front wall 415 of the first housing half 414 and into a boss 432 formed on the rear wall 417 of the second housing half 416. The disk 422 is in turn fixedly mounted on the shaft 430 for rotation therewith. An enlarged head 437 may be formed on an outer shaft portion 441 of the shaft 430 for engaging other mechanical elements, such as arms, wheels, gears, and the like, that are rotatable with respect to the housing 412 or that are stationary with respect to rotation of the housing 412. An O-ring 435, bushing, or the like can be installed in the opening 433 for keeping moisture, dust, and other particles out of the housing 412.

The first and second housing halves 414 and 416 may be connected together through bonding, ultrasonic welding, and/or mechanical fastening in a well-known manner such that the connecting seam 438 (FIG. 15) between the two housing halves is both dust-proof and moisture-proof.

The light collector 420 is preferably in the form of a generally elongate fluorescent-doped or scintillating fiber optic that is shaped into an arcuate section 425 and straight portions 427, 429, with the ends 426, 428 of the straight portions preferably terminating in a common plane. Although not shown, the arcuate section 425 may overlap itself. The arcuate section 425 is preferably centered about the rotational axis 431 and has a predefined radius R. The light collector 420 may be similar in construction to the light collector 42 previously described.

The photosensor module 424 preferably comprises a pair of spaced photosensors 446, 448 (shown in hidden line in FIG. 16), such as a pair of spaced monolithic photodiodes that vary in electrical output in response to variations in light level to which each sensor is exposed. The module 424 includes a power or ground connection 434 and a signal output connection 436 and 438 for each photosensor 446 and 448, respectively. Alternatively, separate photosensors may be used in place of the module 424. Besides photodiodes, other suitable photosensors may be used, including but not limited to, photocells, phototransistors, photoconductors, and the like.

The photosensor module 424 is preferably positioned in the housing 412 such that each photosensor 446 and 448 is positioned adjacent one of the ends 426 and 428, respectively, of the collector 420. In this manner, one sensor 446 detects the level of light present at the end 426, while the other sensor 448 detects the level of light present at the end 428.

The light blocking member 422 preferably comprises a circular plate-like disk 440 having a central aperture 442 and a window 444 spaced from the aperture. The disk 440 is preferably opaque or otherwise constructed such that light emitted from the light source 418 is substantially blocked from reaching a substantial portion of the collector 420. The shaft 430 extends through the central aperture 442 and is preferably fixedly connect to the disk 440 through welding, adhesives, or other well-known fastening technique, such that rotation of the shaft causes simultaneous rotation of the disk. The window 444 is preferably formed as an arcuate or circular opening that extends through the disk 440, but may alternatively be formed as a transparent section on the disk. When formed as a transparent section, the disk 440 may be constructed of a transparent material and an opaque coating may be applied to one or both of the disk surfaces outside of the window area. The window 444 is spaced from the rotational axis 431 a predetermined distance L that is preferably at least substantially equal to the radius R of the arcuate collector section 425 such that the window is aligned with the arcuate collector section during rotation of the disk 440. In this manner, light emanating from the light source 418 passes through the window and is incident over a predefined area of the collector 420 during rotation of the disk 440. The area of light incident on the collector 420 can be adjusted by varying the size of the window. Although the window 444 is shown as arcuate in shape, it is to be understood that the window may be circular, square, or any other suitable shape.

As shown, the light source 418 preferably comprises a pair of incandescent bulbs 450 that are oriented for projecting radiant energy toward the light blocking disk 422 and the collector 420. The light source 418 may alternatively be in the form of one or more fluorescent lights, light-emitting diodes, laser diodes, or any other source that emits radiant energy in the visible, ultra-violet, or infra-red spectrums.

A light diffusing disk 452 is preferably fixedly connected to the first housing half 414 between the light source 418 and the light blocking disk 422. The diffusing disk 452 is preferably constructed of a transparent or translucent material and may include a roughened surface 454 that receives the emitted light from the light source 418 and distributes the emitted light in a more uniform manner to the blocking disk 422 and the collector 420. Although the roughened surface 454 is shown on a side of the disk facing the light source 418, the roughened surface may in addition or alternatively be formed on a side of the disk facing away from the light source. An opening 456 is centrally located in the diffusing disk 452 and provides sufficient clearance for passage of the shaft 430 without contacting the shaft.

A circuit board 460 (shown in hidden line) is preferably mounted in the first housing half 414 and includes circuitry (not shown in FIGS. 14 and 15 that receives and processes signals from the photosensor module 424. A terminal block 462 is also mounted to the housing and includes a power supply terminal 464, a ground terminal 466, and an output terminal 468 that receives the processed signals from the circuitry. If signal processing circuitry is to be located remotely from the optical transducer, then the circuit board may be eliminated. In this case, four terminals may be needed for transmitting both signals from the photodiodes to the remote circuitry, as well as providing power and ground. Where only one photodiode is used for measurement, then only three terminals may be provided when the signal processing circuitry is at a remote location. Where the signals from the circuitry are to be impressed on the power or ground terminal for receipt at a remote location, or transmitted by wireless technology, only one or two terminals may be necessary, especially when the housing is grounded to the vehicle or other object to which it is attached.

The second housing half 416 includes a groove 470 that is shaped to receive the collector 420. The collector is preferably mounted in the groove through adhesives or other bonding techniques, but may alternatively be mounted with suitable brackets and/or fasteners (not shown), or through friction fit. A semi-cylindrical depression 472 is also formed in the housing half 416 above the groove 470 for receiving the photosensor module 424. Electrical wires or traces (not shown) may extend between the terminals 434, 436 and 438 of the module 424 and the circuit board 460. A connector tab 476 cab be formed at an upper end of the first housing half 414 and a similar tab (not shown) can be formed at an upper end of the second housing half 416.

A connector plug 478 is sized to receive the upper end of the housing 412 and includes internal terminals (not shown) that mate with the terminals 464, 466, and 468 for supplying power and ground to the optical transducer 410, and for receiving the processed signals from the optical transducer 410 and transferring the processed signals to a display or other output device. Depressions (not shown) may be formed in the connector 478 for engaging the connector tabs 476 of the housing 412. The depressions together with the tabs form a lockable connection between the connector 478 and the optical transducer 410 in a well-known manner.

According to a further embodiment of the invention, the light collector 420 can comprise the groove 470 formed as an open tunnel or channel with a gap (not shown) in the housing portion 416 as previously described with respect to the FIGS. 7–13 embodiments, in place of the fluorescent-doped fiber optic.

Figure 16:
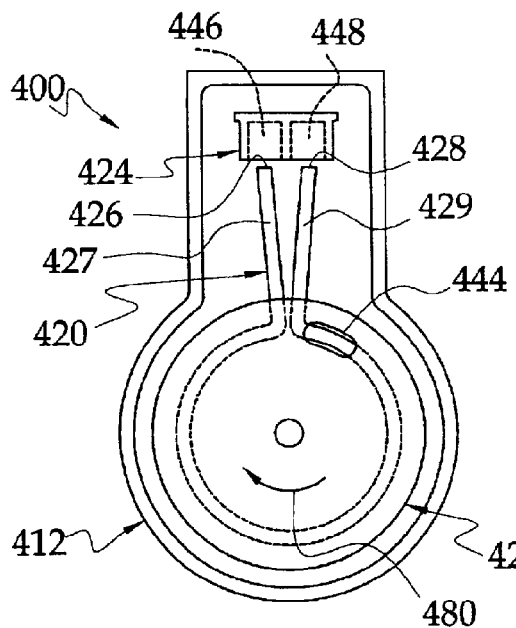
FIG. 16 is a front elevational view of a portion of the optical transducer of FIG. 14 and showing a light blocking member at a first rotational position.

Operation of the optical transducer 410 will now be described, in conjunction with FIGS. 16–19. As shown in FIG. 16, the light blocking disk 422 is in a first position with the window 444 adjacent the straight portion 429 of the light collector 420. Radiant energy from the light source 418 is received on a portion of the collector 420 that is exposed through the window 444. Due to the unique properties of the collector 420, more light will be present at the end 428 than at the end 426 of the collector. This is because the light path from the window 444 to the end 428 is shorter than the light path from the window 444 to the end 426. Light traveling along the longer light path is more subject to refraction or reflection out of the light collector 420 than the light traveling along the shorter light path. The intensity of light at each end 426 and 428 of the light collector 420 is measured by the photosensors 446 and 448, respectively, to thereby give an indication of the position of the window 444 with respect to the collector, and thus the angular position of the shaft 430 with respect to the housing 412.

As the light blocking disk 422 rotates in a direction represented by arrow 480, the distance between the incident light on the collector 420 and the end 428 increases and thus decreases the amount of light present at the end 428. Likewise, the distance between the incident light on the collector 420 and the end 426 decreases, and thus increases the amount of light present at the end 426. The increase and decrease in light intensities are measured by the photosensors 446 and 448, respectively, to thereby give new signals representative of the angular position of the shaft 430 with respect to the housing 412.

Figure 17:
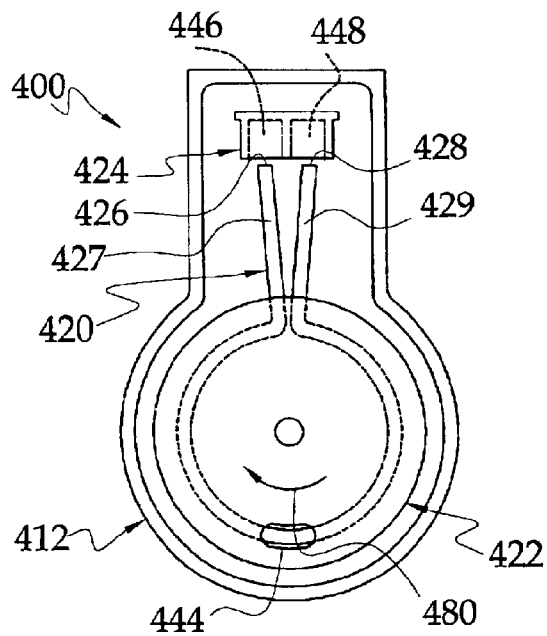
FIG. 17 is a view similar to FIG. 16 and showing the light blocking member at a second rotational position.
Figure 18:
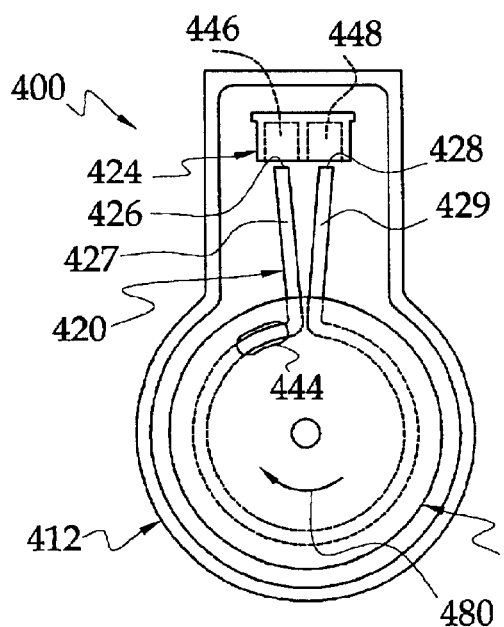
FIG. 18 is a view similar to FIG. 16 and showing the light blocking member at a third rotational position.
Figure 19:
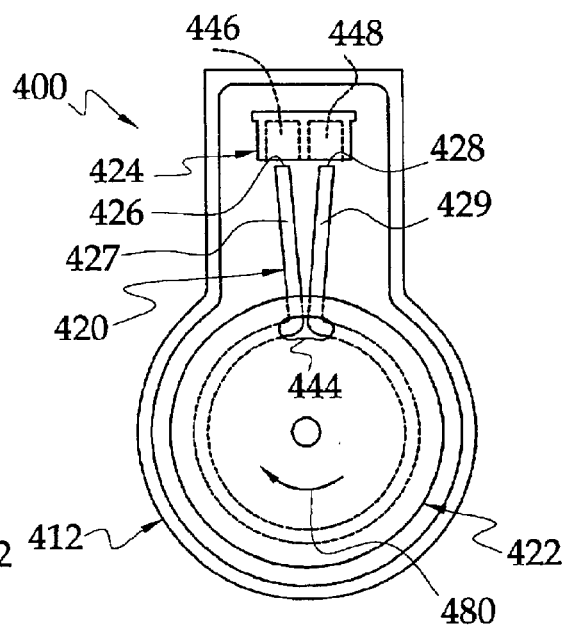
FIG. 19 is a view similar to FIG. 16 and showing the light blocking member at a fourth rotational position.

When the window 444 of the blocking disk 422 arrives at the position shown in FIG. 17, the light intensities at the ends 426, 428 are substantially equal, since the light paths between the light incident on the collector 420 and the ends 426, 428 are substantially equal. As the window 444 of the blocking disk 422 travels from the FIG. 17 position to the FIG. 18 position, the light intensity at the end 426 will be increasingly greater than the light intensity at the end 428 of the collector 420, again due to the shorter light path. Finally, when the window 444 of the blocking disk 422 is in the FIG. 19 position, the light intensities at both ends 426, 428 will be substantially equal, and will be greater than the light intensities of the FIG. 17 position, again due to the shorter light path between the window 444 and the ends 426, 428.

The above described arrangement is especially advantageous since rotational or angular positions between the shaft and housing, will as the direction of shaft rotation can be determined on a continual basis. Moreover, due to the differences in intensities on the ends 26, 28 between the upper window position (FIG. 19) and the lower window position (FIG. 17), the number of shaft rotations can also or alternatively be monitored.

Although two photosensors are preferred, it is to be understood that a single photosensor positioned adjacent one of the ends 426, 428 of the collector 420 may be sufficient in determining shaft position and rotational direction, along with shaft rotation, especially in environments where the light intensity from the light source 418, temperature, and other effects are substantially constant, or when intermittent calibration of the optical transducer can be performed with relative ease.

The above-described embodiment is not only useful for determining orientation and rotation, but may also be used as a compass for determining heading with respect to magnetic north. The disk 440 may be magnetized or a separate magnet may be connect to the disk for rotation therewith such that the disk rotates toward magnetic north.

Figure 20:
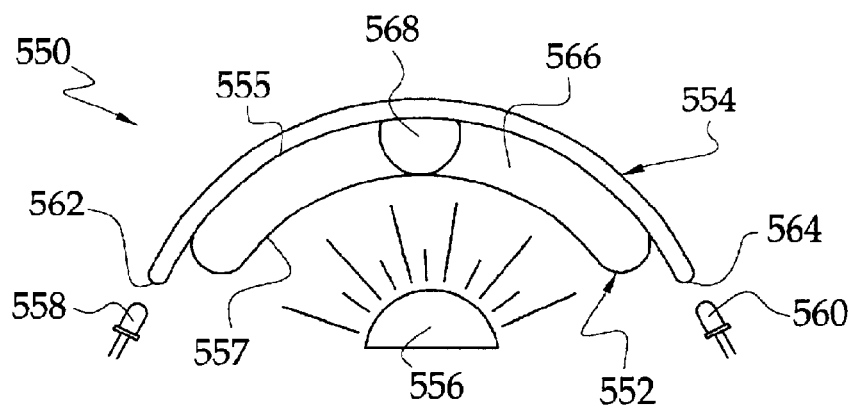
FIG. 20 is a front elevational view of an optical transducer according to a further embodiment of the invention in a first orientation.
Figure 21:
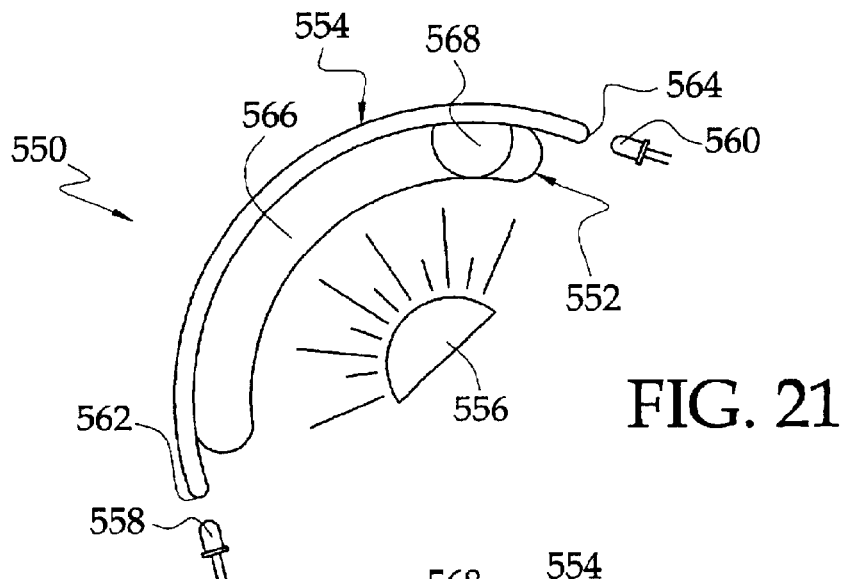
FIG. 21 is a front elevational view similar to FIG. 20 of the optical angular transducer in a second orientation.
Figure 22:
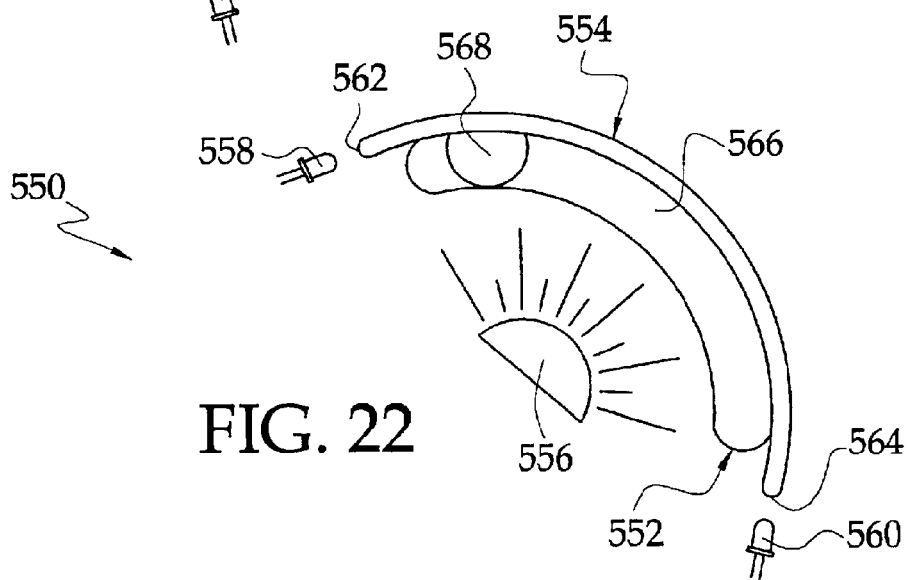
FIG. 22 is a front elevational view similar to FIG. 20 of the optical transducer in a third orientation.

With reference to FIGS. 20–22, a schematic representation of an optical angular transducer 550 according to a further embodiment of the invention is shown. The optical angular transducer 550 includes an enclosed, arcuate vial 552, an elongate light collector 554 positioned adjacent a first side 555 of the vial and conforming to the shape thereof, a light source 556 located on a second side 557 of the vial opposite the collector 554 and arranged for emitting light toward the vial, and a photosensor 558 and 560 positioned adjacent opposite ends 562 and 564, respectively, of the light collector 554. An opaque light blocking liquid 566 or other flowable material that exhibits liquid-like properties, such as sand or other granular-like particles or material, is preferably located in the enclosed vial 552 but does not fill the vial so that a relatively transparent bubble or window 568 extends through the vial from the first side 555 to the second side 557 thereof.

The collector 554 can be similar in construction to the collector previously described with respect to FIG. 1, wherein the collector comprises a fluorescent-doped fiber optic. In another preferred embodiment of the invention, the collector 554 is similar in construction to the collector previously described with respect to the FIGS. 7–14 embodiments, wherein the light collector comprises an open tunnel or channel. Whether the light collector 554 is in the form of a fluorescent-doped fiber optic or open channel, light received on the collector 554 is transmitted to the ends 562, 564 of the collector and detected by the photosensors. The light source 556 and photosensors 558, 560 can be constructed as previously described, including any variations thereof.

When radiant energy is transmitted to the vial 552 from the light source 556, the opaque liquid at least substantially blocks the radiant energy from reaching the collector 554 with the exception of a portion of the radiant energy that is transmitted onto the collector 554 through the window 568.

As shown in FIG. 20, the window 568 is positioned approximately midway between the ends of the vial 552 and thus midway between the ends 562, 564 of the collector 554. In this position, the signals from the photosensors are approximately equal. As the optical transducer is tilted from the FIG. 20 position to the FIG. 21 position, the window 568 travels toward the end 564 of the vial until it reaches the highest point in the vial as the opaque liquid 566 flows to the lowest point of the vial under gravity. Consequently, the amount of light present at the end 564 increases while the amount of light present at the end 562 decreases. The increase and decrease in light intensities at the ends 564 and 562 of the collector 554 are measured by the photosensors 560 and 558 respectively, to thereby give new signals representative of the angular position of the optical transducer 550 with respect to horizontal or vertical.

Likewise, when the optical transducer is tilted in the opposite direction toward the FIG. 22 position, the window 568 travels toward the end 562 of the vial until it reaches the highest point in the vial as the opaque liquid 566 flows to the lowest point under gravity. Consequently, the amount of light present at the end 564 decreases while the amount of light present at the end 562 increases. The increase and decrease in light intensities at the ends 562 and 564 of the collector 554 are measured by the photosensors 558 and 560, respectively, to thereby give new signals representative of the angular position of the optical transducer 550 with respect to horizontal or vertical.

As in the previous embodiments, the direction of tilt can readily be ascertained by determining whether the signal strength is increasing or decreasing at one or both photosensors.

If desired, two such optical transducers 550 may be arranged in transverse planes to thereby determine the amount of tilt and roll of an object to which the optical transducers may be connected.

Although the optical transducer 550 is shown with an arcuate vial, it is to be understood that the vial may be formed as a substantially straight member. As in the previous embodiments, only a single photosensor may be used to determine the angular orientation of the optical transducer 550. Moreover, the position of the light source and collector may be reversed with respect to the vial.

Figure 23:
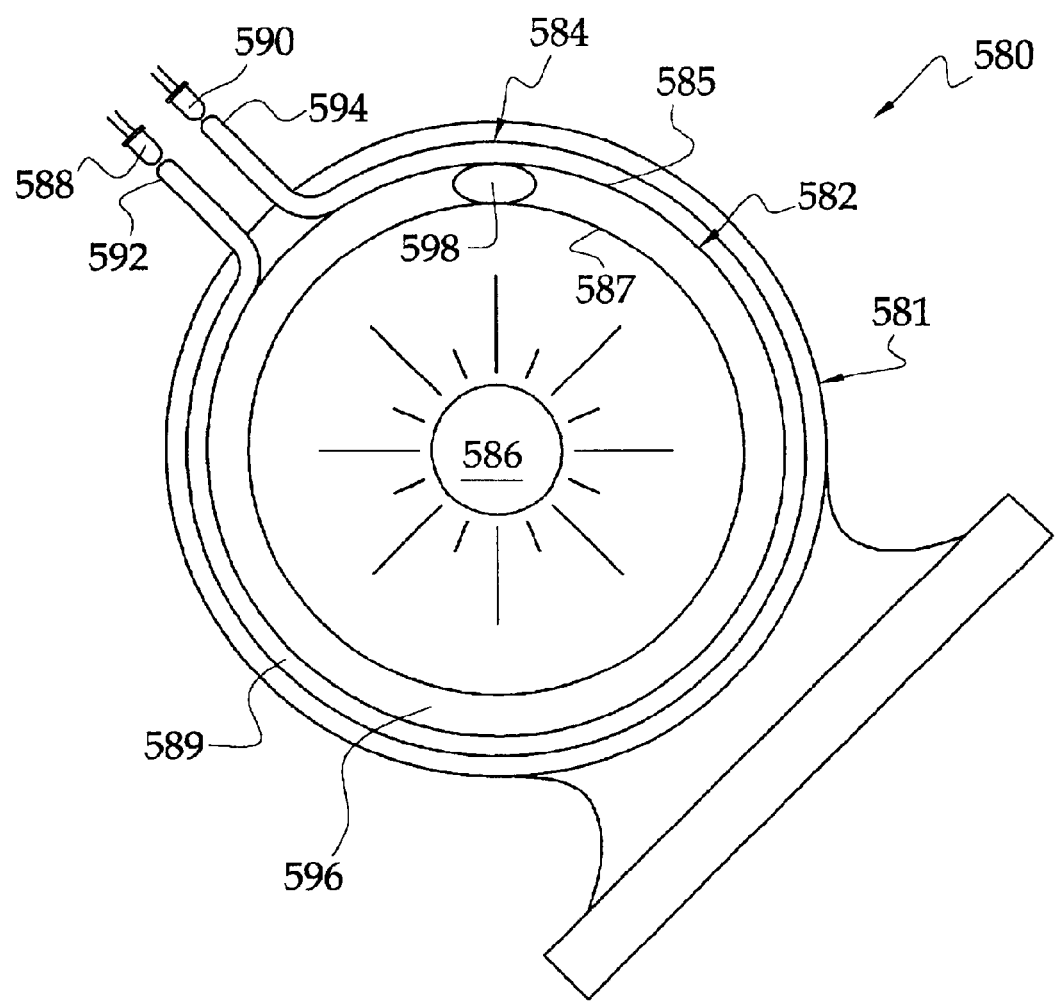
FIG. 23 is a front view of an optical angular transducer according to a further embodiment of the invention.

With reference now to FIG. 23, an schematic representation of an optical transducer 580 according to a further embodiment of the invention is illustrated. The optical transducer 580 includes a housing or base member 581, a ring-shaped vial 582 mounted to the base member, an elongate light collector 584 having a ring-shaped section 589 positioned adjacent an outer circumferential side 585 of the vial and conforming to the shape thereof, a light source 586 located centrally of an inner circumferential side 587 of the vial opposite the collector 584 and arranged for emitting light toward the vial, and a photosensor 588 and 590 positioned at opposite ends 592 and 594, respectively, of the light collector 584. An opaque liquid 596 or other flowable material that exhibits liquid-like properties, such as sand or other granular materials or the like, is located in the enclosed vial 582 but does not fill the vial so that a relatively transparent bubble or window 598 extends through the vial from the outer side 585 to the inner side 587 thereof.

The collector 584 can be similar in construction to the collector previously described with respect to FIG. 1, wherein the collector comprises a fluorescent-doped fiber optic. In another preferred embodiment of the invention, the collector 584 is similar in construction to the collector previously described with respect to the FIGS. 7–14 embodiments, wherein the light collector comprises an open tunnel or channel. Whether the light collector 584 is in the form of a fluorescent-doped fiber optic or open channel, light received on the collector 584 is transmitted to the ends 562, 564 of the collector and detected by the photosensors.

Although not shown, the ring-shaped section 589 of the collector 584 may overlap on itself so that continuous measurement can be made over 360 degrees. The light source 586 preferably emits a circular light pattern such that radiant energy is incident on the entire inner circumferential side 587. The photosensors 588, 590 can also be in the form as previously described with respect to the FIG. 1 embodiment, including any variations thereof.

When radiant energy is transmitted to the vial from the light source 586, the opaque liquid at least substantially blocks the radiant energy from reaching the collector 584 with the exception of a portion of the radiant energy that is transmitted onto the collector 584 through the window 598. As the angular transducer 580 is subject to tilting or rotation, the window 598 will always remain at the highest point of the vial. Since the collector 584 rotates with respect to the window, the distances of the light paths between the window and the ends 592, 594 of the collector 584 change during rotation to thereby change the intensity of light present at each of the ends 592, 594. The amount of intensity at each collector end 592 and 594 is measured by the photosensors 588 and 590, respectively, to thereby determine the position of the window 598, and thus the tilt or rotation of the optical transducer 580. This embodiment is particularly advantageous over the embodiment shown in FIGS. 20-22, in that a greater range of angles can be measured, and the number of rotations of the transducer 580 can be determined in a manner similar to the FIG. 14 embodiment.

Referring now to FIGS. 24–27, a schematic representation of an optical transducer 600 according to a further embodiment of the invention is illustrated. The optical transducer 600 comprises a hollow container or vial 602, a pair of light collectors 604, 606 mounted or otherwise formed on the container, a light source 603 (shown in hidden line) mounted for projecting radiant energy into the container, with photosensors 608 and 610 arranged at opposite ends 605 and 607, respectively, of the light collector 604, and photosensors 612 and 614 arranged at opposite ends 609 and 611, respectively, of the light collector 606.

Figure 25:
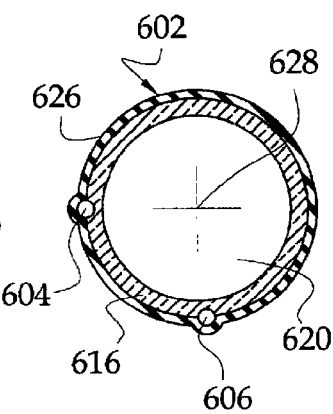
FIG. 25 is a cross sectional view of the optical angular transducer taken along line 25—25 of FIG. 24.

The container 602 is preferably cylindrical in shape and includes a continuous wall 616 connected between a bottom wall 620 and a top wall 622 to thereby form an enclosed, hollow interior 618. An opaque light blocking liquid 624 or other flowable material that exhibits liquid-like properties, such as sand or other granular materials or the like, is located in the hollow interior 618 and preferably fills about half the container. As shown in FIG. 25, the container 602 is preferably constructed of a transparent material, and may be covered by an outer layer 626 of opaque material to prevent the projection of ambient light onto the collectors 604, 606.

The light collectors 604, 606 can be similar in construction to the collector previously described with respect to FIG. 1, wherein the collector comprises a fluorescent-doped fiber optic. In another preferred embodiment of the invention, the collectors 604 and 606 are similar in construction to the collector previously described with respect to the FIG. 13 embodiment, wherein the collector comprises an open tunnel or channel with a substantially transparent rod or tube located in the channel. The light collectors 604, 606 are preferably mounted to or formed on the continuous wall 616 in a direction parallel to a central axis 628 of the container. Preferably, the light collector 606 is circumferentially spaced from the light collector 604 by an angle of 90 degrees.

In operation, the light source 603 projects radiant energy into the container 602 and onto the light collectors 604, 606 not covered by the opaque liquid 624. When the optical transducer is on a level surface, the collectors will be substantially equally covered and uncovered by the opaque liquid. In this position, the amount of light is substantially equally present at the upper ends 605 and 609 of the collectors and is greater than the amount of light substantially equally present at the lower ends 607 and 611 of the collectors. The difference in luminous intensity between the upper and lower ends of the collectors is due to the position of the light source 603 incident on the light collectors. Consequently, the signals generated by the upper photosensors 608 and 612 are substantially equal and greater than the substantially equal signals generated by the lower photosensors 610 and 614.

Figure 24:
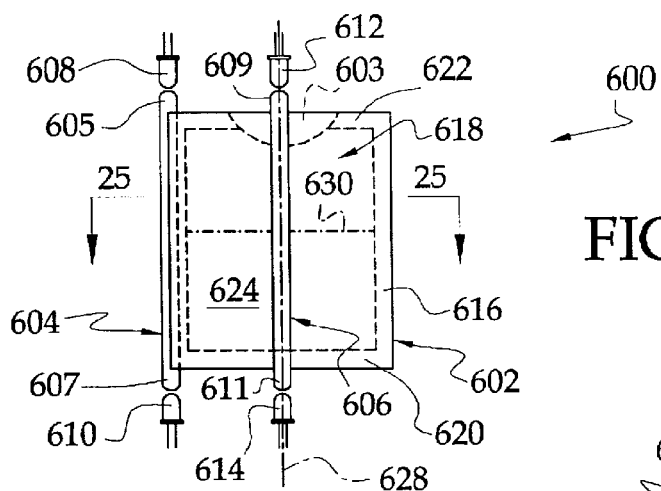
FIG. 24 is a front elevational view of an optical angular transducer according to further embodiment of the invention in a first orientation.
Figure 26:
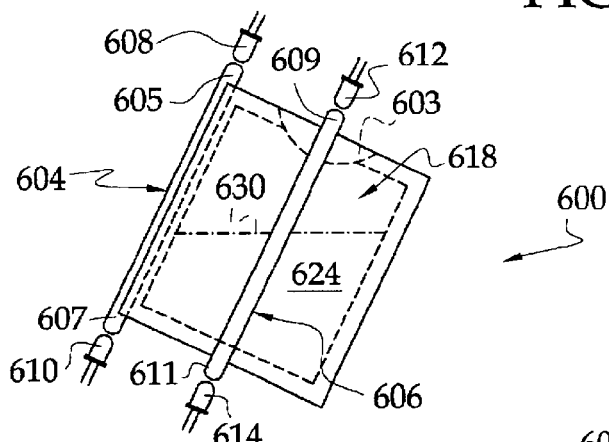
FIG. 26 is a view similar to FIG. 24 with the optical angular transducer in a second orientation.
Figure 27:
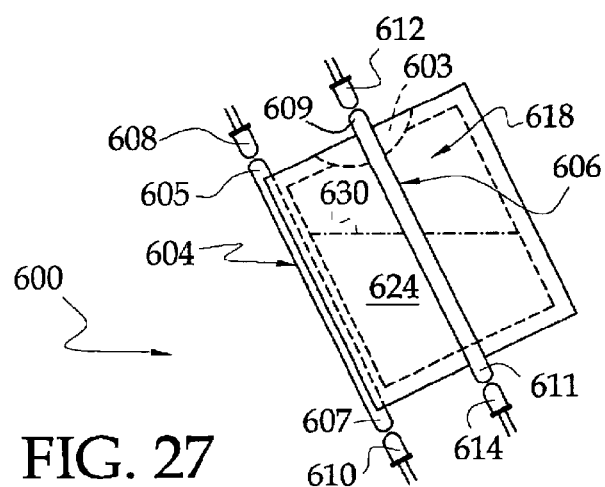
FIG. 27 is a view similar to FIG. 24 with the optical angular transducer in a third orientation.

As the optical transducer 600 tilts in a first plane from the FIG. 24 position to the FIG. 26 position, more of the collector 604 is exposed to radiant energy from the light source 603. Consequently, the intensity of light at the ends of the collector 604 increases to thereby cause a corresponding increase in signal output of the photosensors 608 and 610. Since the photosensor 608 is already near its maximum signal output at the FIG. 26 position due to the position of the light source 203, the change in signal output will be much less than the change in signal output of the lower photosensor 610. Likewise, as the optical transducer 600 tilts in a plane from the FIG. 24 position to the FIG. 27 position, less of the collector 604 is exposed to radiant energy from the light source 603. Consequently, the intensity of radiant energy at the ends of the collector 604 decreases to thereby cause a corresponding decrease in signal output. Again, due to the position of the light source 603, the decrease in radiant intensity at the lower end 607 of the collector 604 will normally be much greater than the decrease in radiant intensity at the upper end 605.

During tilt of the optical transducer in the first plane, the light intensities at the ends of the collector 606 remain, for the most part, unchanged. When the optical transducer is tilted in a second plane perpendicular to the first plane, the light intensities at the ends of the collector 606 will change in a manner similar to the collector 604 as described above, while the light intensities at the ends of the collector 604 will remain substantially unchanged. When simultaneous tilting occurs in both planes, the light intensities at the ends of the collectors 604 and 606 will simultaneously change in proportion to the amount of tilting.

Although two photosensors are associated with each collector, a single photosensor for each collector may be suitable. When a single photosensor is used for each collector, it is preferable that the photosensors be located at the lower ends 607 and 611 of the collectors in order to obtain the greatest measurement bandwidth.

Figure 28:
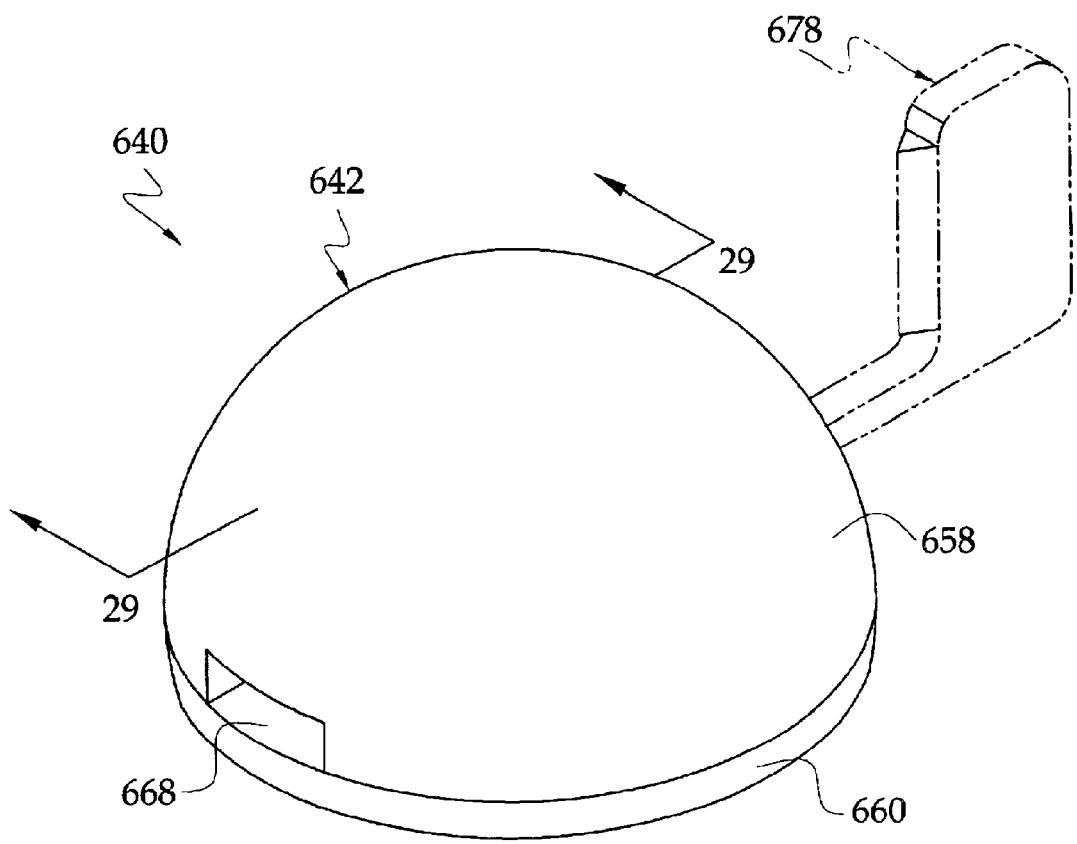
FIG. 28 is an isometric view of an optical force or flow transducer according to a further embodiment of the invention.
Figure 29:
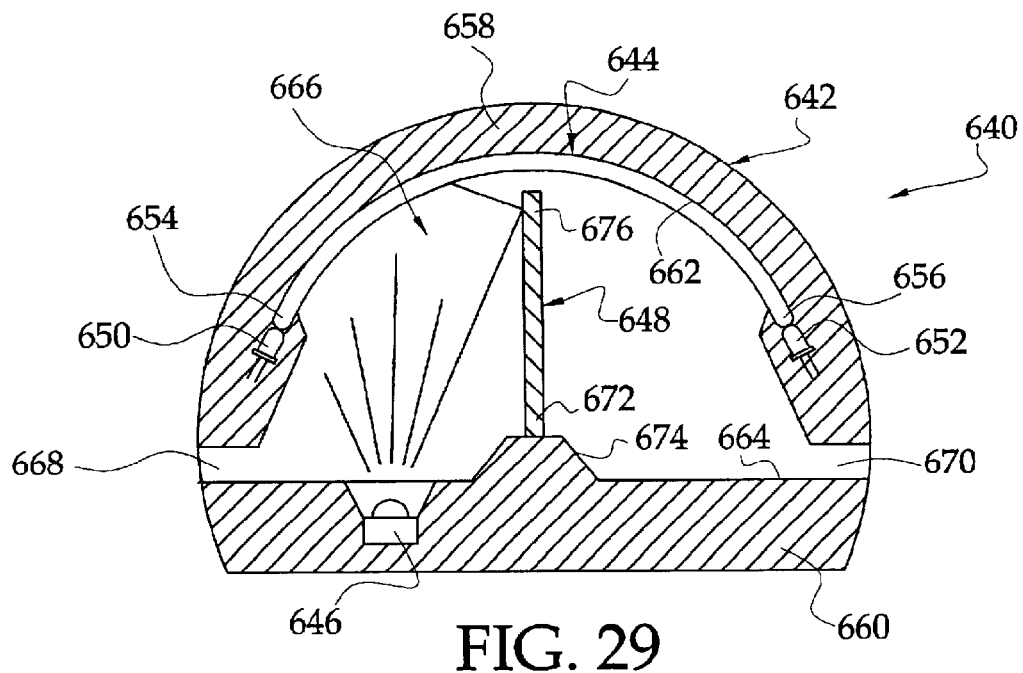
FIG. 29 is a cross sectional view of the optical transducer taken along line 29—29 of FIG. 28 and showing a light blocking member in a first or neutral position.
Figure 30:
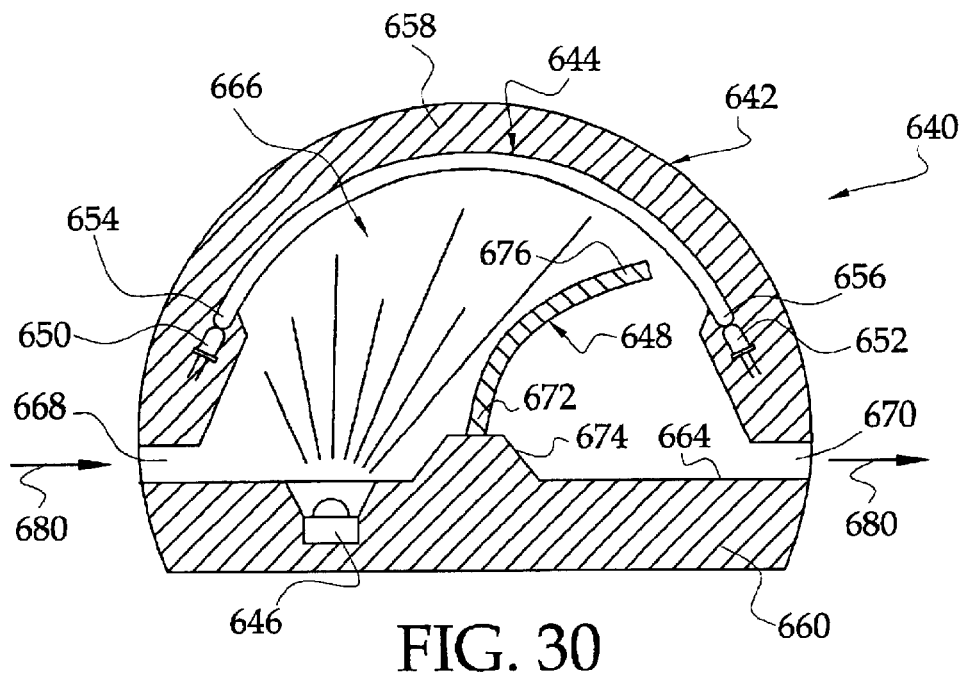
FIG. 30 is a cross sectional view similar to FIG. 29 with the light blocking member in a second position.

With reference now to FIGS. 28–30, an optical transducer 640 according to a further embodiment of the invention is shown. The optical transducer 640 is useful for measuring forces due to acceleration, fluid flow, gravity, or the like. The optical transducer 640 includes a housing 642, a light collector 644 mounted to the housing, a light source 646 mounted to the housing and arranged for projecting radiant energy onto the collector, a light blocking member 648 connected to the housing proximal the light source, and a pair of photosensors 650 and 652 located at opposite ends 654 and 656, respectively, of the collector. The light collector 644, photosensors 650, 652, and the light source 646 may be constructed as previously described with respect to the FIG. 1 embodiment. According to another preferred embodiment, the light collector 644 is similar in construction to the collector previously described with respect to the FIGS. 7–14 embodiments, wherein the light collector comprises an open tunnel or channel.

The housing 642 is preferably semi-spherical in shape, and includes an upper arcuat-shaped wall 658 with an inner arcuate surface 662 and a lower wall 660 with an inner surface 664 that together form a hollow interior 666. A pair of openings 668, 670 are formed on diametrically opposite sides of the housing.

The light collector 644 is preferably associated with the inner arcuate surface 262, while the light source 646 is preferably mounted to the lower wall 660.

The light blocking member 648 is preferably constructed of a thin sheet of material, such as metal or plastic, and exhibits some amount of flexibility when subjected to directly applied or induced forces. The amount of flexibility may vary depending on the particular range of forces to be measured. The light blocking member 648 is preferably mounted to the lower wall 660 in cantilever fashion, and has a first end 672 that can be mounted to a step 674 formed on the inner surface 664 and an outer free end 676 that is normally positioned adjacent the light collector 644 in the neutral position.

When used as a fluid flow meter, such as for wind speed, the housing 642 may be mounted for rotation on a base (not shown) and a vane 678 (shown in phantom line in FIG. 28) may be mounted to the housing so that one of the openings always faces wind direction. For measurement of fluid flow that is always in the same direction or opposing directions, such as within a pipe or conduit, the vane may be eliminated and the housing 642 may be mounted against movement in the pipe or conduit with the openings facing the direction of fluid flow.

In operation, the light blocking member 648 is initially in a neutral position as shown in FIG. 29 when not subject to fluid flow or other forces. In this position, radiant energy from the light source 646 is blocked from reaching approximately half the light collector 644. The photosensors 650 and 652 detect the amount of light incident on the light collector. When fluid flows through the opening 668 in a direction 680, and into the hollow interior 666 of the housing, the light blocking member is forced into a flexed position, as shown in FIG. 30. The amount of flexure depends on the stiffness of the light blocking member and the fluid velocity or acceleration. As the light blocking member flexes, a greater length of the collector is exposed to the radiant energy and a corresponding increase in light intensity at the ends 654 and 656 of the light collector is measured by the photosensors 650 and 652, respectively. As in the previous embodiment, the increase in light intensity at the end 656 of the collector will be greater than the end 654 due to the position of the light source 646 incident on the collector 644. Thus, the photosensor 652 will exhibit a greater signal change than the photosensor 650. When fluid flow is in the opposite direction, the light blocking member 648 will flex in the opposite direction to thereby block more of the collector from the radiant energy.

When the optical transducer 640 is used as a force transducer for acceleration (including deceleration), vibration, and the like, the openings 668, 670 may be eliminated, and relatively clear damping fluid, such as mineral oil, may be located in the hollow interior 666. Due to the cantilever mounting of the light blocking member 648, a predetermined amount of flexure will occur, depending on the particular flexibility chosen for the light blocking member, when subject to forces. The amount of flexure, which is directly related to force, can then be measured with one or more of the photosensors 650, 652. If desired, a weight (not shown), can be mounted to the outer free end 676 of the light blocking member 648 to give greater responsiveness to applied forces.

The above-described arrangement may also or alternatively be used for measuring the orientation and direction of rotation of the optical transducer 640 with respect to horizontal or vertical. As the optical transducer is rotated, the light blocking member, especially with an attached weight at its outer free end, may exhibit increasing flexure when subject to increasing gravitational forces. Again, the amount of flexure depends on the flexibility of the light blocking member and the amount of weight, if any, connected thereto.

In a further embodiment, the light source may be mounted for movement with the blocking member, or the blocking member itself may include a flexible fiber optic, light pipe, or the like, or may be formed of a flexible fiber optic for projecting radiant energy onto the light collector 244.

Figure 31:
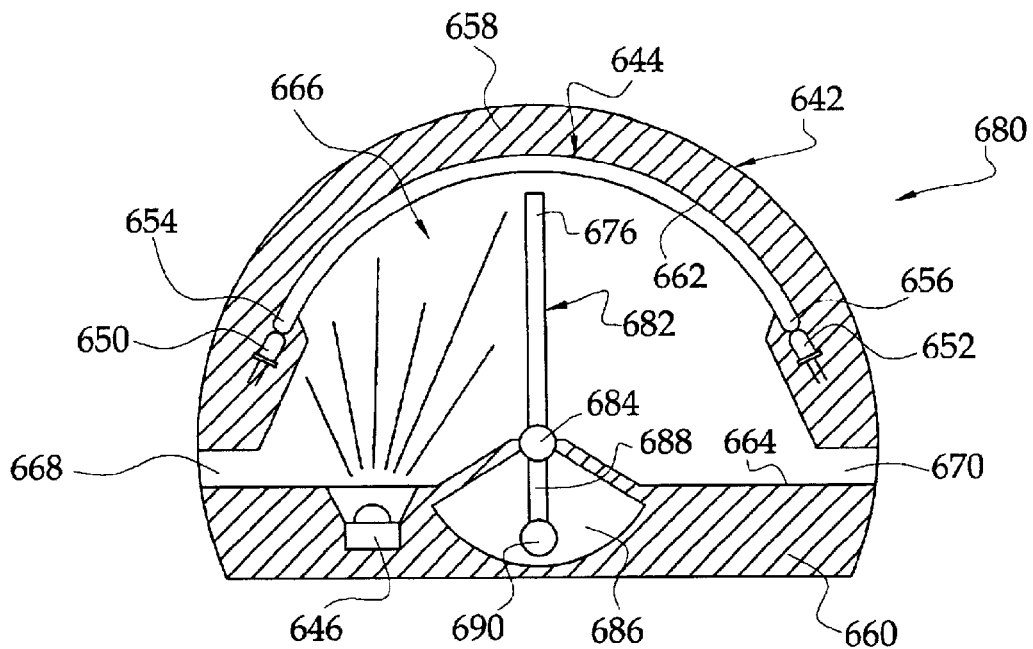
FIG. 31 is a cross sectional view similar to FIG. 29 of an optical transducer according to a further embodiment of the invention with a light blocking member in a first or neutral position.
Figure 32:
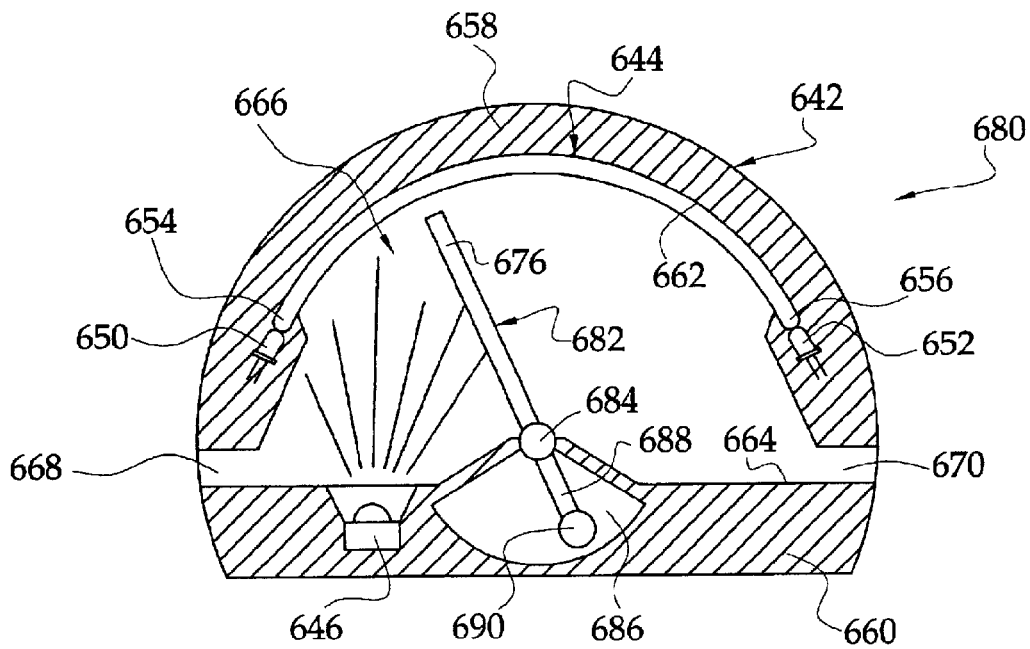
FIG. 32 is a cross sectional view similar to FIG. 31 of the optical transducer with the light blocking member rotated to a second position.

Referring now to FIGS. 31 and 32, an optical transducer 680 according to a further embodiment of the invention is illustrated, wherein like parts in the previous embodiment are represented by like numerals. In this embodiment, a damping chamber 686 is formed in the lower wall 660. A relatively stiff light blocking member 682 is pivotally mounted to the wall 660 at a pivot joint 684 with a lower end 688 of the light blocking member extending into the damping chamber. A weight 690 is mounted on the lower end 688 for returning the damping member to a neutral position when not subject to applied or induced forces. Alternatively, the weight 690 may be replaced with a return spring or similar mechanism. Damping fluid is preferably located in the damping chamber 686 for damping rotational movement of the blocking member 682.

Operation of the optical transducer 680 is similar to the previous embodiment, with the exception that the light blocking member 682 pivots about the pivot joint 690 when subject to applied or induced forces. In this manner, more or less of the light collector 644 is exposed to radiant energy from the light source 646, depending on the direction of pivotal movement. The amount of light collector length exposed to the radiant energy is measured by one or both of the photosensors 650 and 652.

In a further embodiment of the invention, the light source 646 may be located at the outer free end 676 of the blocking member for movement therewith. In a further arrangement, the blocking member itself may include a fiber optic, light pipe, or the like, for projecting radiant energy onto the light collector 244.

Figure 33:
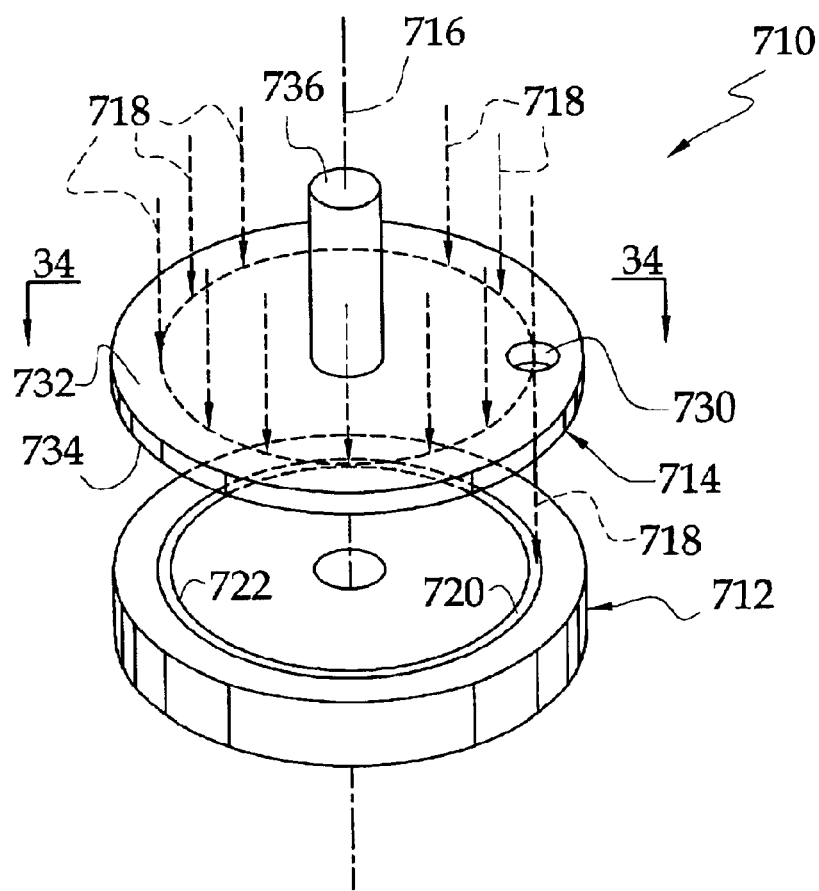
FIG. 33 is an isometric view of an optical rotary transducer according to the invention.
Figure 34:
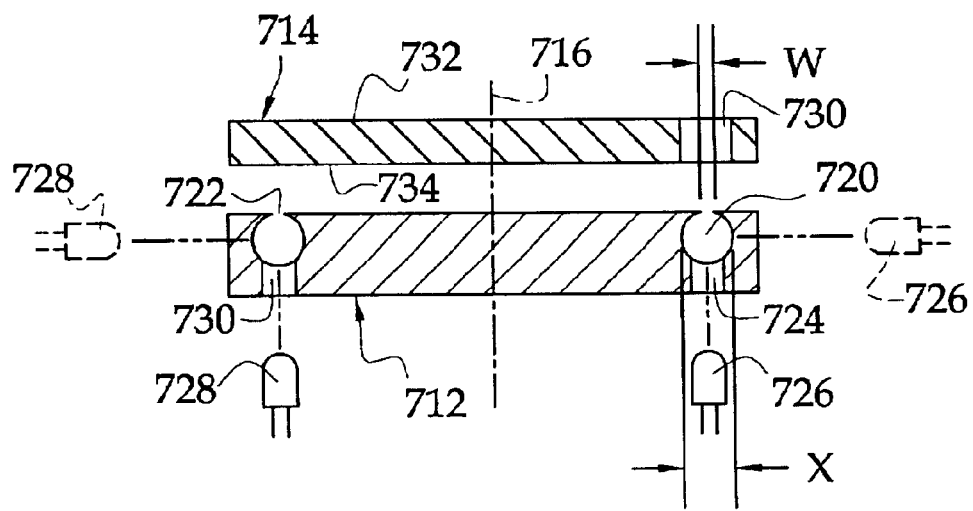
FIG. 34 is a cross sectional view of the optical rotary transducer taken along line 34—34 of FIG. 33.

Referring now to FIGS. 33 and 34, an optical rotary transducer 710 according to a further embodiment of the invention is illustrated. The optical rotary transducer 710 includes a base member 712, a light blocking member 714 that rotates with respect to the base member about a central axis 716, and a light source that preferably projects light in a substantially uniform manner toward the light blocking member 714, as represented by arrows 718.

A light collector arranged as a continuous light collecting open tunnel or channel 720 is formed in the base member 712. As shown, the light collecting channel 720 opens toward the light blocking member 714 through a window or gap 722. More than one light collecting channel of different diameters may be provided in the base member 712, depending on the particular application. The base member 712, including the channel 720, is preferably constructed of an opaque material and may have an inner reflective coating. As in the previous embodiments, the gap 722 has a width W that is preferably less than a cross dimension X of the channel 720. When the channel is substantially circular in cross-section, the width W is preferably less than the diameter of the channel, as represented by the cross dimension X. A bore 724 extends into the light collecting channel and a photosensor 726 is preferably positioned in the bore for detecting the amount of light incident at that position in the channel. The photosensor 726 can be similar to the photosensors previously described. Preferably, the photosensor 726 extends sufficiently into the bore and/or channel 720 to detect light traveling through the channel. Alternatively, one end of a fiber optic or fiber optic bundle (not shown) can be positioned in the bore and/or channel and the photosensor can be positioned at an opposite end of the fiber optic or fiber optic bundle for detecting the amount of light incident at that position in the channel. A further photosensor 728 and bore 730 are preferably located 180 degrees from the bore 724 and the photosensor 726 for detecting or verifying the direction of movement of incident light around the channel 720. Other photosensors can be arranged around the channel 720 at spaced intervals. For example, when four photosensors are used, the photosensors can be arranged around the channel 720 at 90 degree intervals.

Although the photosensors 726 and 728 are shown arranged for detecting light at the bottom of the channel 720, one or more photosensors can be arranged for detecting light at the side of the channel, as represented by the photosensors 726 and 728 in phantom line.

The light blocking disk 714 is preferably constructed of an opaque material. An opening or window 730 preferably extends axially through the light blocking disk 714 from an upper surface 732 to a lower surface 734 thereof. In this manner, light incident on the light blocking disk 714 passes through the window 730 and into the channel 720 of the base member 712. A shaft 736 is preferably fixed to the light blocking disk 714 for rotating the disk about its central axis in response to an applied rotational force on the shaft. The disk may be weighted on one side for measuring inclination, or may be magnetized for determining orientation with respect to magnetic north, or may be balanced for determining rotational angle and revolution.

The optical rotary transducer 710 is similar in operation to the optical transducer 410 as previously described with respect to FIGS. 16–19. When the light blocking disk 714 is in a first position with the window 730 proximal the bore 724, radiant energy projected through the window 730 from the light source is incident in the channel 720. Due to the unique arrangement of the channel 720, more light will be present at the photosensor 726 than the photosensor 728. Light is reflected out of the channel 720 through the gap 722 as the incident light reflects and/or refracts through the channel toward the photosensor 728. Thus, the intensity of light detected by the photosensor 726 will be greater than the intensity of light detected by the photosensor 28, to thereby give an indication of the position of the window 730 with respect to the channel 720, and thus the angular position of the disk 714 with respect to the base member 712.

As the disk rotates in the clockwise (or counterclockwise) direction as viewed in FIG. 33, the window 730, and the light projecting through the window, will travel along the channel toward the photosensor 728 and away from the photosensor 726. The distance between the incident light on the channel 720 and the photosensor 726 increases and the distance between the incident light and the photosensor 728 decreases. Accordingly, the intensity of light at the photosensor 726 decreases while the intensity of light at the photosensor 728 increases. This increase and decrease in light intensities at the photosensors 728 and 726, respectively, are indicative of the rotational position and travel direction of the disk 714 with respect to the base member 712. As the window 730 rotates past the photosensor 728, the distance between the incident light on the channel 720 and the photosensor 728 increases and thus decreases the amount of light present at the photosensor 728. Likewise, the distance between the incident light on the channel 720 and the photosensor 726 decreases, and thus increases the amount of light present at the photosensor 726.

The above-described arrangement is especially advantageous in that it is possible to continuously measure relative rotational or angular positions between the light blocking member and the base member, as well as the direction of rotation. Moreover, due to the differences in intensities at the photosensors, the number of complete shaft rotations or revolutions can also or alternatively be monitored.

Although two photosensors are preferred, it will be understood that a single photosensor positioned for detecting the amount of light at a particular location in the channel 720 may be sufficient to determine disk position, rotational direction, and the number of complete revolutions.

Figure 35:
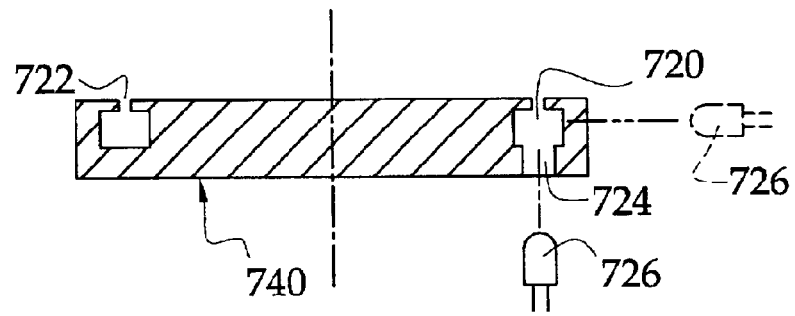
FIG. 35 is a cross sectional view of a light collector according to a further embodiment of the invention for the optical rotary transducer of FIG. 34.

With reference now to FIG. 35, a base member 740 according to a further embodiment of the invention is illustrated in cross section, wherein like parts in the previous embodiment are represented by like numerals. The base member 740 is preferably similar in construction to the base member 712 previously described, with the exception that the light collecting channel 720 is rectangular in cross section. It will be understood that the cross sectional shape of the light collecting channel 720 can be triangular, oval, octagonal or other polygonal shapes, as well as other shapes. Preferably, a width W of the gap 722 is less than a cross dimension X. When the channel 720 is rectangular, the cross dimension is a width of the channel.

Figure 36:
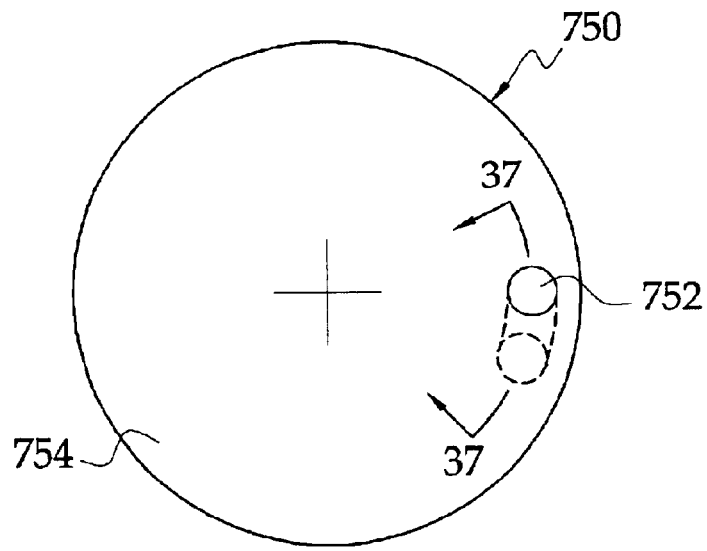
FIG. 36 is a top plan view of a light blocking member according to a further embodiment of the invention for use in the optical rotary transducer of FIG. 34.
Figure 37:
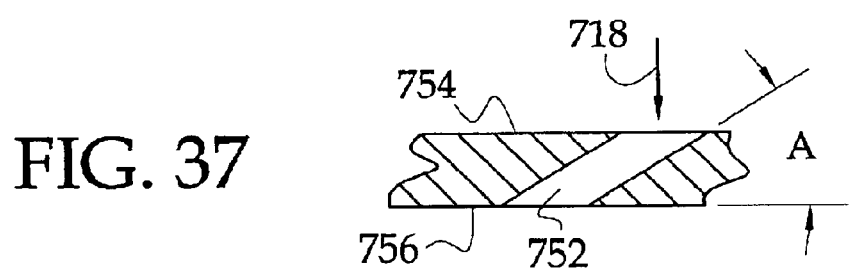
FIG. 37 is a cross sectional view of a portion of the light blocking member taken along line 37—37 of FIG. 36.

With reference now to FIGS. 36 and 37, a light blocking disk 750 according to a further embodiment of the invention is illustrated. The light blocking disk 750 is preferably similar in construction to the light blocking disk 714 previously described, with the exception that an opening or window 752 preferably extends through the disk between an upper surface 754 and a lower surface 756 thereof and an angle A with respect to the lower surface 756. In this manner, light is projected through the window 752 to thereby change the angle of light that enters the light collecting channel 720.

Although the light blocking member has been described in each of the above embodiments, it will be understood that the light blocking member can be eliminated and the light source and light collector can be arranged for relative movement to thereby vary the position of the incident light on the light collector.

Figure 38:
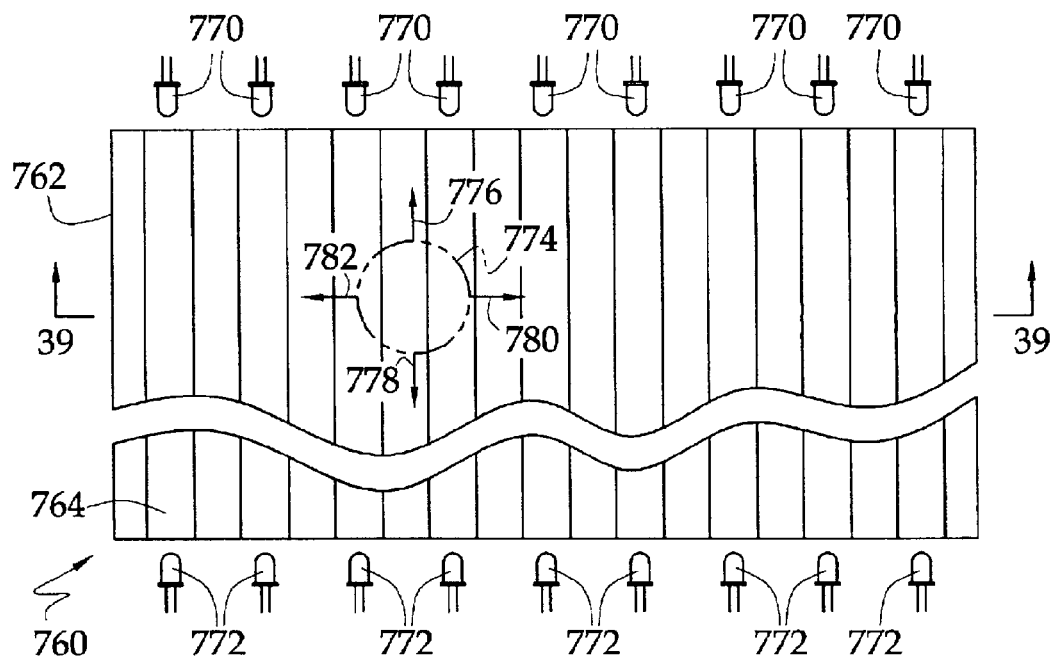
FIG. 38 is a top plan view of a dual axis optical position transducer according to a further embodiment of the invention.
Figure 39:
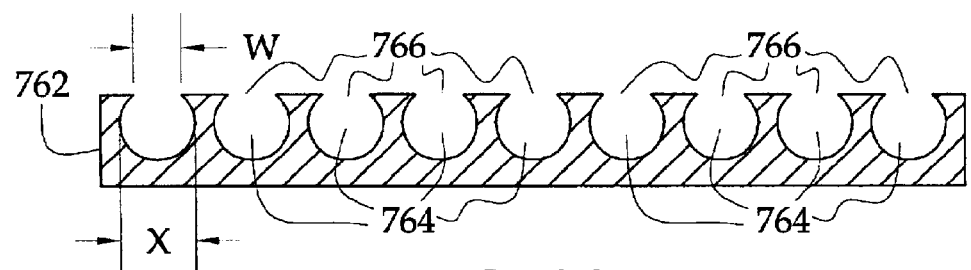
FIG. 39 is a cross sectional view of the dual axis optical position transducer taken along line 39—39 of FIG. 38.

Turning now to FIGS. 38 and 39, an optical transducer 760 according to a further embodiment of the invention for measuring movement along two mutually perpendicular axes is illustrated. The optical transducer 760 has a base member 762 with an array of light collecting tunnels or channels 764 that are preferably formed in the base member. As shown, each channel 764 includes a window or gap 766 with a width W that is preferably smaller than a cross dimension X of the channel, as previously described. When the channel is circular in cross section as shown, the cross dimension is preferably a diameter of the channel. When the channel has another cross sectional shape, such as the channel 720 in FIG. 35, the cross dimension X is preferably a width of the channel. An upper photosensor 770 and a lower photosensor 772 are preferably positioned at the upper and lower ends, respectively, of each channel for detecting the intensity of radiant energy at the upper and lower ends. Although the upper and lower photosensors are shown as separate components, they can be embodied as photosensor arrays. Alternatively, the end of a fiber optic or other light guide can be positioned at the end of each channel for conducting the radiant energy at the channel ends to a remote location for measurement by remotely positioned photosensors or photosensor arrays.

In use, a light beam 774, such as a collimated light beam, is projected onto one or more of the channels. As the light beam 774 travels in a first direction parallel with the channels, as represented by arrow 776, the light present at the upper end of the associated channel(s) will increase in intensity while the light present at the lower end of the associated channel(s) will decrease in intensity. Likewise, as the light beam 774 travels in a second direction opposite the first direction, as represented by arrow 778, the light intensity at the upper end of the associated channel(s) will decrease while the light intensity at the lower end of the associated channel(s) will increase. As the light beam 774 travels across the channels in directions represented by arrows 780 and 782, the light intensity at the upper and lower ends of one channel will decrease proportionately while the light intensity at the upper and lower ends of an adjacent channel will increase proportionately. This proportionate decrease and increase of light intensity is indicative of both the position and direction of travel of the light beam 774 across the channels. Accordingly, movement of the light beam 774 can be detected at any position on the optical transducer 760 to thereby determine the relative movement in two mutually perpendicular axes between two objects. A similar array or single channel can be oriented perpendicular to the base member 762 for measuring movement in three mutually perpendicular axes.

According to another preferred embodiment of the invention, a plurality of fluorescent-doped fiber optics can be positioned parallel to each other in a side-by-side relationship so that the direction of light beam movement can be determined. Preferably, a relative small fluorescent-doped fiber optic is used, such as a 0.25 mm diameter fiber optic. Each fiber optic can be separated at its ends from adjacent fiber optics for connection to different photosensors or photosensor elements on a photosensor array.

Figure 40:
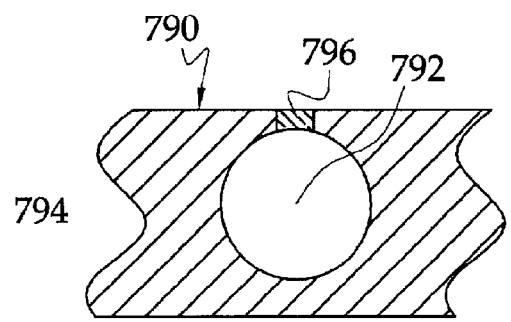
FIG. 40 is a cross sectional view of a light collector according to a further embodiment of the invention for use in any of the previous embodiments.

With reference now to FIG. 40, a light collector 790 according to a further embodiment of the invention is illustrated. The light collector 790 is preferably formed as a closed tunnel 792 in a substrate 794. A transparent or translucent window 794 is preferably formed integrally with the substrate so that light can be received in the tunnel 790 through the window, with a portion of the light being reflected and/or refracted out of the tunnel along its length, as previously described. The window 796 can be formed as a thin wall of the substrate, or may be less dense than the surrounding substrate so that the window is greater in translucency or transparency than the surrounding substrate. Alternatively, the window can be formed separately and attached to the substrate, or may be simultaneously formed during co-extrusion, injection molding, or other forming operation. An inner surface of the tunnel 792 can be reflective. When the substrate is formed of a plastic material, a reflective coating can be formed on the tunnel surface through vacuum deposition or other well-known coating techniques. When the substrate is formed of a metal material, the reflective surface can be formed by electropolishing or plating the tunnel surface.

The light collector 790 can be used in place of the fluorescent-doped fiber optic and the open channel in each of the above embodiments, so that a portion of the light incident on the light collector travels along its length, while a portion of the light is lost along its length.

Figure 41:
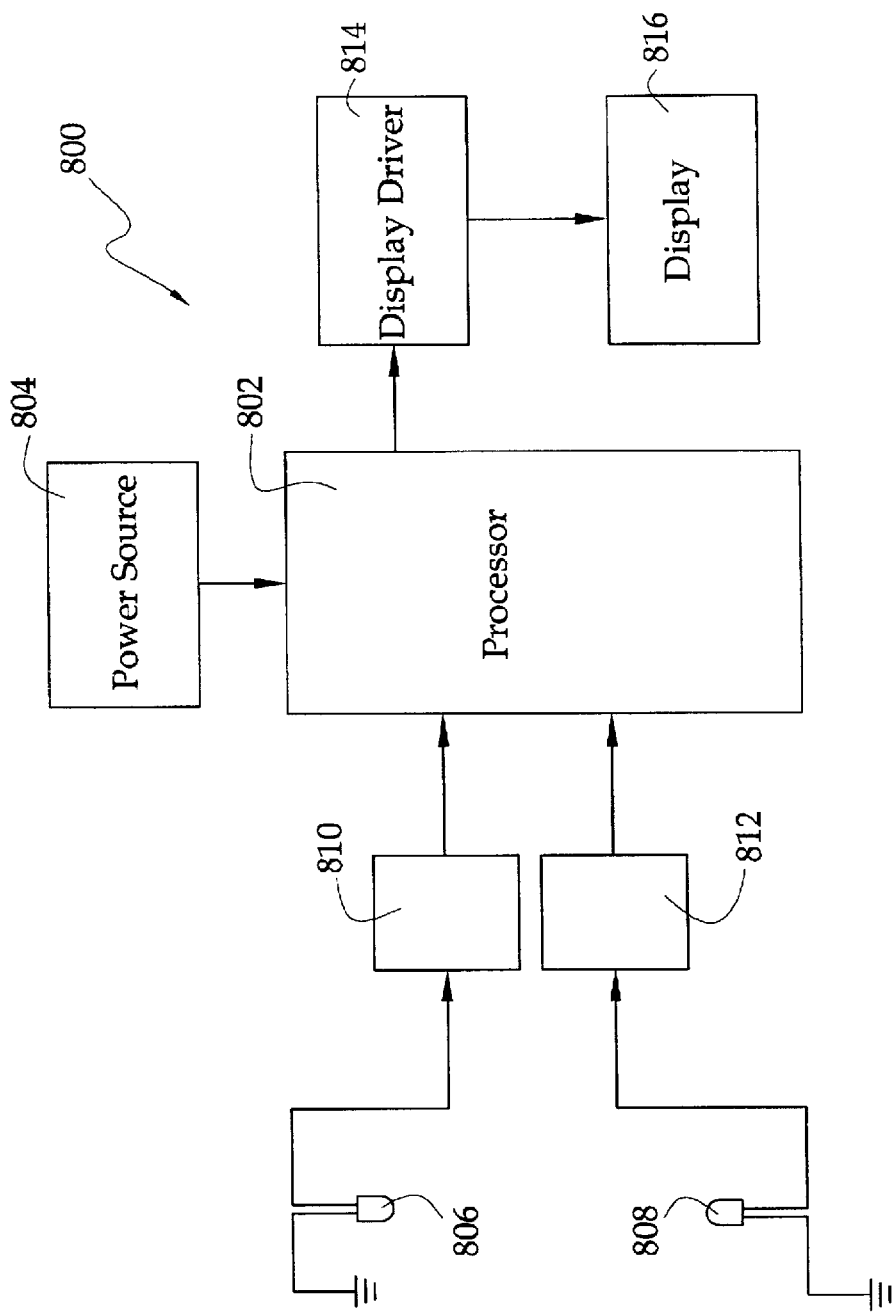
FIG. 41 is a block diagram schematic representation of electrical signal processing circuitry that may be used with all embodiments of the optical transducer of the present invention.

With reference now to FIG. 41, a schematic representation of electrical processing circuitry 800 that may be used in each of the above embodiments is illustrated. The circuitry 800 may be included on the circuit board 242 (FIG. 8), the circuit board 460 (FIG. 14), or at a remote location from the optical transducer and preferably includes a microprocessor 802, an electrical power source 804 connected to the microprocessor, photosensors 806 and 808 connected to the microprocessor via signal amplifiers 810 and 812, respectively, and a display 814 connected to the microprocessor through a display driver 816. Although many different types of signal amplifiers may be used, a dual operational amplifier for the signal amplifiers 810 and 812 is preferred due to its low cost, ability to operate with a single power supply, and relative ease in setting a desired gain factor. Although in many instances a signal amplifier may be necessary for the photosensors, the amplifier may be eliminated if the photosensor signals are strong enough to be accepted by the microprocessor. The signal strength can be varied depending on the intensity of the light source emission, the sensor type, the amount of collector area exposed to the light source, as well as the diameter or other cross dimension of the collector.

The analog signals produced by the photosensors 806 and 808 are amplified and sent to the microprocessor 802, preferably at different input ports. Preferably, the input ports of the microprocessor are analog input ports that receive and convert the signals to digital form before further processing. Alternatively, separate A/D converters or a multiplexer with a single A/D converter may be provided. The converted signals from the photosensors 806 and 808 can then be normalized in the microprocessor 802 in order to compensate for variations in light output of the light source due to aging and other factors, as well as variations in temperature. Normalization of the photodiodes is accomplished by mathematic manipulation of the converted photosensor signals. By way of example, the following normalization formula can be programmed into the microprocessor:

$$D_N = \frac{D_1 - D_2}{D_1 + D_2}$$

where $D_N$ is the normalized output, $D_1$ is the signal from the photosensor 806, and $D_2$ is the signal from the photosensor 808. Depending on the location of the incident light with respect to the light collector, the normalized output may be positive or negative. The normalized output can then be further manipulated, if necessary, and sent to the display 816 via the display driver 814 in a well-known manner.

The term "opaque" as used throughout the specification refers to any material that blocks a sufficient amount of light from the collector(s) such that movement of the light blocking member is detectable. Thus, translucent blocking members or blocking members filtering out certain wave lengths of radiant energy may also be suitable for use in the above embodiments. Moreover, although the floats and light blocking members in the above-described embodiments have been shown as spherical, arcuate and disk-shaped, in construction, they may be cylindrical or of any other shape, as long as a portion of the light collector is blocked from the light source during movement of the light blocking member(s).

It is to be understood that the terms upper, lower, inner, outer, horizontal, and vertical, as well as their respective derivatives and other terms of orientation and position as may be used throughout the specification, refer to relative, rather than absolute orientations or positions.

It will be further understood that the term "light" as used throughout the specification is not limited to the visible light region of the electromagnetic spectrum, but can include electromagnetic energy in the infrared region, visible light region and the ultraviolet region and may include other regions.

While the invention has been taught with specific reference to the above embodiments, those skilled in the art will recognize that changes can be made in form and detail without departing from the spirit and the scope of the invention.

For example, in each of the above embodiments, one or more of the photosensors may be separated from the ends of the light collector by one or more intermediate structures, such as fiber optics, light pipes, conduits, or other light transmitting means. Moreover, the light source and/or photosensors may be arranged in orientations and/or locations other than those described above, and may comprise mirrors, lenses, fiber optics, and so on, for transmitting radiant energy to or receiving radiant energy from, the light collector.

With respect to the above-described embodiments for detecting or measuring liquid level, the level of other materials that exhibit liquid-like flow properties can be measured with the present invention, such as grain, sand, etc. Thus, the term "liquid" as used throughout the specification may also be applied to such materials. Furthermore, although the light collector(s) are shown located in the wall of the tubular member, it will be understood that the collector(s) may be arranged on the inner or outer surfaces thereof. In addition, the light collector(s) may spiral around the tubular member to thereby increase the length of the collector(s), and thus the sensitivity of the transducer to changes in liquid level.

Moreover, although the tubular member and light collector in some of the described embodiments are substantially circular in cross section, it is contemplated that other cross sectional shapes such as oval, triangular, rectangular or other polygonal shapes, arcuate, etc., may be used for the tubular member and/or light collector(s).

Thus, the described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. An optical transducer, comprising:
   a light source far emitting radiant energy;
   a base member having a surface;
   an elongate light collector positioned for receiving radiant energy from the light source, the elongate light collector comprising a tunnel formed in the base member, a length of the tunnel intersecting the surface to form an elongate opening, such that radiant energy projected by the light source through the elongate opening is incident on the tunnel and transmitted along a length of the tunnel; and
   at least one photosensor positioned for detecting an amount of the transmitted radiant energy;
   wherein the amount of radiant energy detected by the at least one photosensor is indicative of at least relative position between the incident radiant energy and the at least one photosensor.

2. An optical transducer according to claim 1, wherein the elongate opening is formed as an open gap in the base member.

3. An optical transducer according to claim 2, wherein a width of the gap is less than a cross dimension of the tunnel.

4. An optical transducer according to claim 1, wherein a width of the elongate opening is less than a cross dimension of the tunnel.

5. An optical transducer according to claim 1, wherein the light source and light collector are relatively movable to thereby vary the intensity of radiant energy along the tunnel.

6. An optical transducer according to claim 1, and further comprising a light blocking member extending between the light source and at least a portion of the elongate light collector for blocking at least a portion of the radiant energy from the light collector, the light blocking member and tight collector being relatively movable for varying the position of the radiant energy incident on the light collector to thereby vary the amount of radiant energy transmitted along the tunnel.

7. An optical transducer according to claim 6, wherein the light blocking member comprises an enclosed vial with a fluent light blocking material filling a portion of the vial, a window being formed at a position in the vial absent the fluent material;
   wherein rotation of the optical transducer causes the fluent material to flow under gravity and thereby change the position of the window of the light blocking member and thus the position of the radiant energy incident on the light collector.

8. An optical transducer according to claim 7, wherein the fluent material comprises a relatively opaque liquid.

9. An optical transducer according to claim 8, wherein the fluent material campuses granular material.

10. An optical transducer according to claim 7, wherein the enclosed vial is arcuate-shaped, and the light collector includes an arcuate-shaped section adjacent the vial.

11. An optical transducer according to claim 7, wherein the enclosed vial is ring-shaped, and the light collector includes a ring-shaped section adjacent the vial.

12. An optical transducer according to claim 6, wherein the light blocking member is located between the light source and the at least one photosensor.

13. An optical transducer according to claim 12, wherein the base member is positioned in a liquid and is adapted to extend beyond an upper surface of the liquid, the light blocking member comprising the upper surface of the liquid, such that the amount of radiant energy received by the light collector and detected by the at least one photosensor is indicative of liquid level.

14. An optical transducer according to claim 6, wherein the light blocking member comprises a disk rotatable about a central disk axis and a window formed on the disk, and further wherein the light collector has an arcuate section in alignment with the elongate opening of the light blocking member, such that rotation of the disk about the central disk axis with respect to the light collector vanes the position of the radiant energy incident on the arcuate section of the light collector to thereby indicate relative angular displacement between the disk and the light collector.

15. An optical transducer according to claim 14, wherein the light collector extends in a continuous circle such that a rotational position of the disk with respect to the light collector can be detected over 360 degrees.

16. An optical transducer according to claim 15, wherein the window of the light blocking member is arranged to project radiant energy into the tunnel at an acute angle with respect to a central axis of the tunnel.

17. An optical transducer according to claim 1, wherein the light source is arranged to project radiant energy into the tunnel at an acute angle with respect to a central axis of the tunnel.

18. An optical transducer according to claim 1, and further comprising a plurality of light collectors in side-by-side relationship, such that movement of the incident radiant energy across and along the light collectors can be detected.

19. An optical transducer according to claim 18, wherein each light collector has opposite ends, and further wherein the at least one photosensor comprises first and second photosensors positioned for detecting the amount of radiant energy at the opposite ends of each light collector.

20. An optical transducer according to claim 1, wherein the at least one photosensor comprises first and second photosensors positioned for detecting the amount of radiant energy in the tunnel at spaced locations.

21. An optical transducer according to claim 1, and further comprising a light blocking member having a flexible plate, a first end of the flexible plate being fixedly mounted with respect to the light source and a second free end adjacent the light collector, the free end being movable in response to an applied force to thereby change a length of the light collector exposed to the radiant energy.

22. An optical transducer according to claim 1, and further comprising a light blocking member having a relatively stiff plate, a first end of the plate being rotatably mounted with respect to the light source about a pivot joint and a second free end of the plate being adjacent the light collector, the plate being rotatable about the pivot joint in response to an applied force to thereby change a length of the light collector exposed to the radiant energy.

23. An optical transducer according to claim 1, wherein a portion of the transmitted radiant energy exits the tunnel through the elongate opening.

24. An optical transducer comprising:
   a light source for emitting radiant energy;
   a base member comprising an elongate, tubular member having a central axis and a bore extending parallel to the central axis;
   an elongate light collector positioned for receiving radiant energy from the light source, the elongate light collector comprising a tunnel formed in the base member that extends along a length of the tubular member for receiving, at least indirectly, radiant energy from the light source, the light collector having opposite ends such that radiant energy incident on a length of the light collector is transmitted to at least one of the light collector ends; the light collector further comprising a collector window that extends along a length of the tunnel, such that radiant energy projected by the light source through the window is incident on the tunnel and transmitted along a length of the tunnel;

a light blocking member being located within the bore for blocking at least a portion of the radiant energy from the light collector, the light blocking member being movable in the bore with respect to the light collector for varying the position of the radiant energy incident on the light collector to thereby vary the amount of radiant energy transmitted to at least one of the light collector ends;

at least one photosensor positioned for detecting the amount of the transmitted radiant energy at the at least one light collector end;

wherein the amount of radiant energy detected by the at least one photosensor is indicative of relative movement between the tubular member and the light blocking member.

25. An transducer according to claim 24, wherein the light blocking member comprises at least one float that is adapted to ride on an upper surface of a liquid that may be present in the tubular member.

26. An optical transducer according to claim 25, wherein the light source is positioned at one end of the tubular member coincident with the bore.

27. An optical transducer according to claim 24, and further comprising a shaft having one end connected to the light blocking member and an opposite end extending out of the tubular member, wherein the amount of radiant energy detected by the at least one photosensor is indicative of linear shaft movement.

28. An optical transducer according to claim 27, wherein the light blocking member is located between the light source and the at least one photosensor.

29. A method of detecting relative position between a first object and a second object, the method comprising:

forming an elongate light collector on the first object, the elongate light collector including a tunnel, a length of the tunnel intersecting a surface of the first object to form an elongate opening;

projecting radiant energy through the elongate opening and into the tunnel from the second object;

transmitting the radiant energy along a length of the tunnel; and detecting an amount of the transmitted radiant energy;

wherein the detected amount of radiant energy is indicative of the relative position between the first and second objects.

30. A method according to claim 29, wherein a portion of the transmitted radiant energy exits the tunnel through the elongate opening.

31. A method according to claim 29, wherein the elongate opening is formed as an open gap in the base member.

32. A method according to claim 31, wherein a width of the gap is less than a cross dimension of the tunnel.

33. A method according to claim 29, wherein a width of the elongate opening is less than a cross dimension of the tunnel.

* * * * *